US008401360B2

(12) United States Patent
Mizuno

(10) Patent No.: US 8,401,360 B2
(45) Date of Patent: Mar. 19, 2013

(54) APPARATUS AND ASSOCIATED METHODOLOGY FOR GENERATING A PICTURE-IN-PICTURE DISPLAY FROM TWO VIDEO SCREENS

(75) Inventor: Masayoshi Mizuno, Tokyo (JP)

(73) Assignee: Sony Corporation, Tokyo (JP)

( * ) Notice: Subject to any disclaimer, the term of this patent is extended or adjusted under 35 U.S.C. 154(b) by 980 days.

(21) Appl. No.: 12/269,316

(22) Filed: Nov. 12, 2008

(65) Prior Publication Data

US 2009/0154897 A1 Jun. 18, 2009

(30) Foreign Application Priority Data

Dec. 14, 2007 (JP) ................ P2007-323294

(51) Int. Cl.
*H04N 5/765* (2006.01)
*H04N 5/932* (2006.01)

(52) U.S. Cl. ........................ 386/200; 386/201

(58) Field of Classification Search .......... None
See application file for complete search history.

(56) References Cited

U.S. PATENT DOCUMENTS

| | | | | |
|---|---|---|---|---|
| 2003/0223731 A1* | 12/2003 | Carlsgaard et al. | ............ | 386/46 |
| 2004/0028142 A1* | 2/2004 | Kim | ........................ | 375/240.25 |
| 2005/0162546 A1* | 7/2005 | Hosoda et al. | ................ | 348/441 |
| 2007/0025696 A1* | 2/2007 | Kim et al. | ........................ | 386/95 |
| 2007/0085575 A1* | 4/2007 | Cooper | ........................ | 327/108 |

* cited by examiner

*Primary Examiner* — William C Vaughn, Jr.
*Assistant Examiner* — Oluwaseun A Adegeye
(74) *Attorney, Agent, or Firm* — Oblon, Spivak, McClelland, Maier & Neustadt, L.L.P.

(57) ABSTRACT

A reproducing apparatus simultaneously reproduces a first video signal and a second video signal reproduced at any timing against the first video signal. A first (second) converting section outputs the first (second) video signal having a first frame frequency alternately for three successive frames and two successive frames to convert the first (second) video signal having the first frame frequency into the video signal having a second frame frequency. They have a relationship of 2 to 5. A controlling section performs control such that timing at which a field group of the three successive frames of the first video signal having the second frame signal is changed to a field group of the two successive frames thereof matches timing at which a field group of the three successive frames of the second video signal having the second frame signal is changed to a field group of the two successive frames thereof.

17 Claims, 26 Drawing Sheets

*Fig. 14*

| PRIMARY VIDEO | SECONDARY VIDEO | | |
|---|---|---|---|
| | MPEG2 | MPEG4 AVC | VC-1 |
| MPEG2 | ○ | ○ | ○ |
| MPEG4 AVC | × | ○ | × |
| VC-1 | × | × | ○ |

Fig. 15

| PRIMARY VIDEO | | | | SECONDARY VIDEO | | | |
|---|---|---|---|---|---|---|---|
| HORIZONTAL SIZE [PIXELS] | VERTICAL SIZE [PIXELS] | FRAME RATE [Hz] | PROGRESSIVELY/ INTERLACED | HORIZONTAL SIZE [PIXELS] | VERTICAL SIZE [PIXELS] | FRAME RATE [Hz] | PROGRESSIVELY/ INTERLACED |
| 1920/1440 | 1080 | 29.97 | INTERLACED | 720 | 480 | 29.97 | INTERLACED |
| | | | | 1920 | 1080 | | |
| | | | | 1440 | 1080 | | |
| | | 25 | INTERLACED | 720 | 576 | 25 | INTERLACED |
| | | | | 1920 | 1080 | | |
| | | | | 1440 | 1080 | | |
| | | 23.976 | PROGRESSIVELY | 720 | 480 | 23.976 | PROGRESSIVELY |
| | | | | 1920 | 1080 | | |
| | | | | 1440 | 1080 | | |
| | | 24 | PROGRESSIVELY | 720 | 480 | 24 | PROGRESSIVELY |
| | | | | 1920 | 1080 | | |
| | | | | 1440 | 1080 | | |
| 1280 | 720 | 59.94 | PROGRESSIVELY | 720 | 480 | 29.97 | PROGRESSIVELY |
| | | | | 1280 | 720 | 59.94 | |
| | | 50 | PROGRESSIVELY | 720 | 576 | 25 | PROGRESSIVELY |
| | | | | 1280 | 720 | 50 | |
| | | 23.976 | PROGRESSIVELY | 720 | 480 | 23.976 | PROGRESSIVELY |
| | | | | 1280 | 720 | | |
| | | 24 | PROGRESSIVELY | 720 | 480 | 24 | PROGRESSIVELY |
| | | | | 1280 | 720 | | |
| 720 | 480 | 29.97 | INTERLACED | 720 | 480 | 29.97 | INTERLACED |
| 720 | 576 | 25 | INTERLACED | 720 | 576 | 25 | INTERLACED |

APPARATUS AND ASSOCIATED METHODOLOGY FOR GENERATING A PICTURE-IN-PICTURE DISPLAY FROM TWO VIDEO SCREENS

CROSS REFERENCES TO RELATED APPLICATIONS

The present invention contains subject matter related to Japanese Patent Application JP 2007-323294 filed in the Japanese Patent Office on Dec. 14, 2007, the entire contents of which being incorporated herein by reference.

BACKGROUND OF THE INVENTION

1. Field of the Invention

The present invention relates to a reproducing apparatus, a reproducing method, and a recording medium that can be suitably used when a plurality of video signals are simultaneously reproduced.

2. Description of the Related Art

In recent years, as the digital high definition television broadcasts have been practically implemented, in the National Television System Committee (NTSC) video data format, progressively scanned video data having a frame frequency of 59.94 Hz (60 Hz), which are capable of displaying more precise pictures, are being dominantly used instead of traditionally interlaced scanned video data having a frame frequency of 29.97 Hz (30 Hz).

In such an environment, display apparatus such as flat panel display units using a liquid crystal display (LCD) or a plasma display panel (PDP) that can display progressively scanned video data having a frame frequency of 59.94 Hz (60 Hz) are being placed in the market. Display apparatus that the users use as mainstream units, however, are those that can display interlaced scanned video data having a frame frequency of 29.97 Hz (30 Hz).

On the other hand, movie pictures are produced using traditional optical films as progressively scanned video data with 24 frames per second, namely having a frame frequency of 24 Hz.

Thus, when progressively scanned video data having a frame frequency of 24 Hz are displayed by a display apparatus that can display progressively scanned video data having a frame frequency 29.97 Hz (30 Hz), it is necessary to cause the reproducing apparatus side to convert progressively scanned video data having a frame frequency of 24 Hz into interlaced scanned video data having a frame frequency of 30 Hz (field frequency of 60 Hz).

When progressively scanned video data having a frame frequency of 24 Hz (hereinafter referred to as 24p video data) are converted into interlaced scanned video data having a frequency of 30 Hz (field frequency of 60 Hz) (hereinafter referred to as 60i video data), 24p video data are alternately converted into three frames and two frames of 60i video data according to a predetermined conversion pattern. Thus, this process is referred to as the 3-2 pull-down (or 2-3 pull-down) process.

Next, the 3-2 pull-down process, which converts 24p video data into 60i video data, will be described. There is a relationship of 2 to 5 in frame frequencies between 24p video data and 60i video data. Thus, as shown in FIGS. 1A and 1B, in the 3-2 pull-down process, for example, whenever each frame of 24p video data is output, three successive frames and two successive frames of 60i video data (see FIG. 1B) are alternately output. Thus, in the 3-2 pull-down process, 24p video data are converted into 60i video data.

International Publication No. 04/032494 (hereinafter referred to as Patent Document 1) describes a technique that performs the 3-2 pull-down process that converts 24p video data based on a film material into 60i video data.

SUMMARY OF THE INVENTION

Some recent reproducing apparatus have a so-called picture-in-picture function that reproduces a first picture as a main picture, reproduces a second picture as a sub picture at any timing, and superimposes the two pictures so as to simultaneously reproduce them.

When such a reproducing apparatus converts 24p video data into 60i video data by the 3-2 pull-down process and reproduces the 60i video data, if the apparatus simultaneously reproduces the two pictures using the picture-in-picture function, the second picture may appear in a comb shape depending on timing at which the apparatus reproduces the second picture, namely so-called combing occurs.

In view of the foregoing, it would be desirable to provide a reproducing apparatus, a reproducing method, and a reproducing program that can prevent combing from occurring when the picture-in-picture function is used.

According to an embodiment of the present invention, there is provided a reproducing apparatus which simultaneously reproduces a first video signal and a second video signal reproduced at any timing against the first video signal. The reproducing apparatus includes a first converting section, a second converting section, and a controlling section. The first converting section outputs the first video signal having a first frame frequency alternately for three successive frames and two successive frames so as to convert the first video signal having the first frame frequency into the first video signal having a second frame frequency, the first frame frequency and the second frame frequency having a relationship of 2 to 5. The second converting section outputs the second video signal having the first frame frequency alternately for three successive frames and two successive frames so as to convert the second video signal having the first frame frequency into the second video signal having the second frame frequency, the first frame frequency and the second frame frequency having a relationship of 2 to 5. The controlling section performs control such that timing at which a field group based on fields of the three successive frames of the first video signal having the second frame signal is changed to a field group based on fields of the two successive frames thereof matches timing at which a field group based on fields of the three successive frames of the second video signal having the second frame signal is changed to a field group based on fields of the two successive frames thereof.

According to an embodiment of the present invention, there is provided a reproducing method of simultaneously reproducing a first video signal and a second video signal reproduced at any timing against the first video signal. The first video signal having a first frame frequency is output alternately for three successive frames and two successive frames so as to convert the first video signal having the first frame frequency into the first video signal having a second frame frequency, the first frame frequency and the second frame frequency having a relationship of 2 to 5. The second video signal having the first frame frequency is output alternately for three successive frames and two successive frames so as to convert the second video signal having the first frame frequency into the second video signal having the second frame frequency, the first frame frequency and the second frame frequency having a relationship of 2 to 5. Control is performed such that timing at which a field group based on fields of the three successive frames of the first video signal having the second frame signal is changed to a field group based on fields of the two successive frames thereof matches timing at which a field group based on fields of the three successive frames of the second video signal having the second frame signal is changed to a field group based on fields of the two successive frames thereof.

According to an embodiment of the present invention, there is provided a recording medium storing a reproducing program which causes a computer apparatus to execute a reproducing method of simultaneously reproducing a first video signal and a second video signal reproduced at any timing against the first video signal. The first video signal having a first frame frequency is output alternately for three successive frames and two successive frames so as to convert the first video signal having the first frame frequency into the first video signal having a second frame frequency, the first frame frequency and the second frame frequency having a relationship of 2 to 5. The second video signal having the first frame frequency is output alternately for three successive frames and two successive frames so as to convert the second video signal having the first frame frequency into the second video signal having the second frame, the first frame frequency and the second frame frequency having a relationship of 2 to 5. Control is performed such that timing at which a field group based on fields of the three successive frames of the first video signal having the second frame signal is changed to a field group based on fields of the two successive frames thereof matches timing at which a field group based on fields of the three successive frames of the second video signal having the second frame signal is changed to a field group based on fields of the two successive frames thereof.

According to an embodiment of the present invention, changes of field groups of primary video data as a first video signal are matched with those of secondary video data as second video signal, combing that occurs when the secondary video data is reproduced can be prevented.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 14 is a schematic diagram describing combinations of encoding formats of primary video data and secondary video data;

FIG. 15 is a schematic diagram describing combinations of encoding formats of primary video data and secondary video data;

DETAILED DESCRIPTION OF THE PREFERRED EMBODIMENTS

Next, with reference to the accompanying drawings, embodiments of the present invention will be described. According to the embodiments of the present invention, when a reproducing apparatus reproduces audio/video (AV) data are reproduced from a record medium such as a Blu-ray disc read-only memory (BD-ROM) (Blu-ray is a registered trademark), combing that occurs when a plurality of video data are reproduced using the picture-in-picture function is prevented. In the following description, it is assumed that AV data are reproduced from a BD-ROM.

For easy understanding for the embodiments of the present invention, the management structure of AV data recorded on a BD-ROM, which is a read-only Blu-ray disc specified in "Blu-ray Disc Read-Only Format Ver 1.0 part 3 Audio Visual Specifications" will be described in brief. Hereinafter, the management structure of this BD-ROM is referred to as the Blu-ray Disc Movie & Video (BDMV) format.

A bit stream encoded according to an encoding system such as Moving Pictures Experts Group (MPEG) video or MPEG audio and multiplexed according to the MPEG2 System is referred to as a clip AV stream (or AV stream). A clip AV stream is recorded as a file on the disc by a file system defined in "Blu-ray Disc Read-Only Format Part 2", which is one of "Blue-ray Disc" standards. This file is referred to as a clip AV stream file (or AV stream file).

A clip AV stream file is a management unit on the file system. Thus, a clip AV stream file may not be a management system that the user can easily understand. Taking into account of user's convenience, it is necessary to provide a mechanism that combines and reproduces video content divided into a plurality of clip AV stream files, a mechanism that reproduces a part of a clip AV stream file, and a mechanism that records information necessary for smoothly performing a special reproducing operation and a cue-reproducing operation as a database to a disc. "Blu-ray Disc Read-Only Format part 3", which is one of Blu-ray Disc standards, specifies this database.

Figure 1:
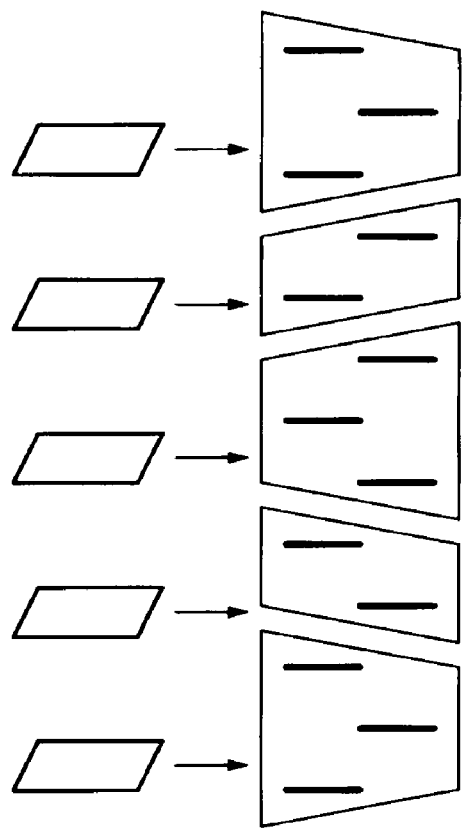
FIG. 1A and FIG. 1B are schematic diagrams describing a 3-2 pull-down process.
Figure 2:
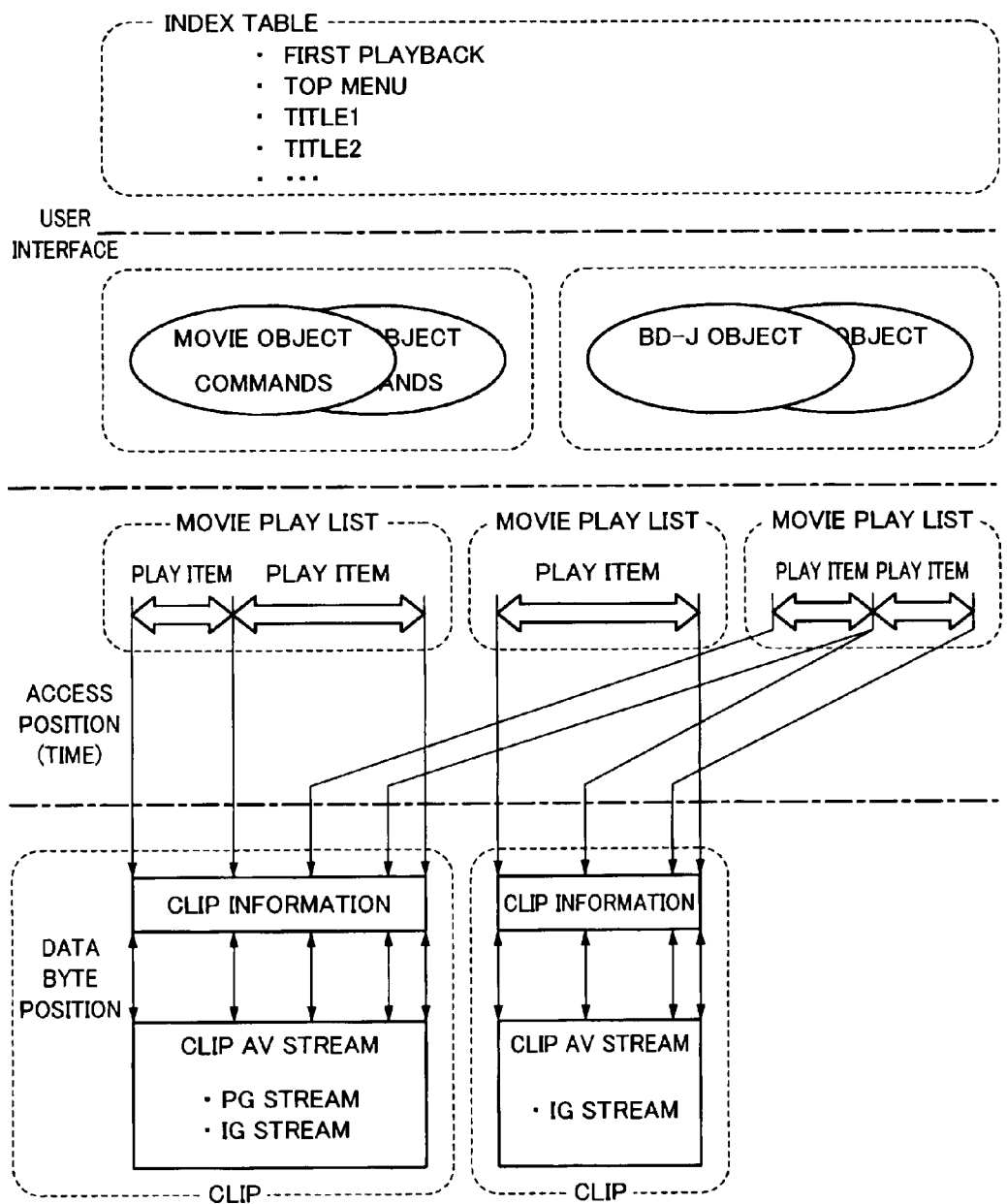
FIG. 2 is a schematic diagram showing an outline of a BD-ROM data model.

FIG. 2 shows an outline of a BD-ROM data model. As shown in FIG. 2, a BD-ROM has a data structure composed of four layers. The lowest layer is a layer for clip AV streams (this layer is conveniently referred to as the clip layer). The immediately upper layer is a layer for movie play lists (Movie PlayList) and play items (PlayItem) that represent reproduction positions of clip AV streams (this layer is conveniently referred to as the play list layer). The further immediately upper layer is a layer for movie objects (Movie Object) and so forth. Each movie object is composed of a command that represents a reproduction order of movie play lists (this layer is conveniently referred to as the object layer). The highest layer is a layer for an index table that manages titles and so forth recorded on the BD-ROM (this layer is conveniently referred to as the index layer).

Next, the clip layer will be described. A clip AV stream is a bit stream of which video data and audio data have been multiplexed in the format, for example, of an MPEG2 transport stream (MPEG2 TS). Information regarding the clip AV stream is recorded as clip information in a file.

In addition, streams for a subtitle and a menu displayed in association with content data of video data and audio data are multiplexed in the clip AV stream. A graphics stream for a sub title is referred to as a presentation graphics (PG) stream. On the other hand, a stream for data of a menu is referred to as an interactive graphics (IG) stream. An interactive graphics (IG) menu reproduced from an interactive graphics (IG) stream can contain items, for example, of buttons, icons, thumbnails, or the like that the user can input to perform predetermined operations.

A clip AV stream file and a clip information file for corresponding clip information are treated as one object and referred to as a clip. In other words, a clip is one object composed of a clip AV stream and clip information.

A file is generally treated as a byte sequence. Content of a clip AV stream file is arranged on the time base. Entry points of clips are represented mainly on the basis of times. When a time stamp of an access point to a predetermined clip is represented, address information at which data are read from the clip AV stream file can be used.

Next, the play list layer will be described. A movie play list represents an AV stream file to be reproduced and is composed of sets of reproduction start points (IN points) and reproduction stop points (OUT points) that represent regions to be reproduced of the represented AV stream file. A set of information of the reproduction start point and the reproduction stop point is referred to as a play item (PlayItem). A movie play list is composed of a set of play items. When a play item is reproduced, a part of an AV stream file to which the play item refers is reproduced. In other words, a region of a clip is reproduced based on information of an IN point and an OUT point of a play item.

Next, the object layer will be described. A movie object contains an HDMV navigation command program (HDMV program) and a terminal information associated with the movie object. An HDMV program is a command that controls the reproduction of a play list. Terminal information contains information that permits the user to perform an interactive operation for the BD-ROM player. User operations such as calling of a menu screen and title search are controlled based on the terminal information.

A BD-J object is composed of an object written in a Java program (registered trademark). Since a BD-J object is beyond scope of this embodiment of the present invention, its detailed description will be omitted.

Next, the index layer will be described. The index layer is composed of an index table. The index table is a top table that defines titles of the BD-ROM disc. The reproduction of titles of the BD-ROM disc is controlled by a module manager of BD-ROM resident system software based on title information stored in the index table.

Figure 3:
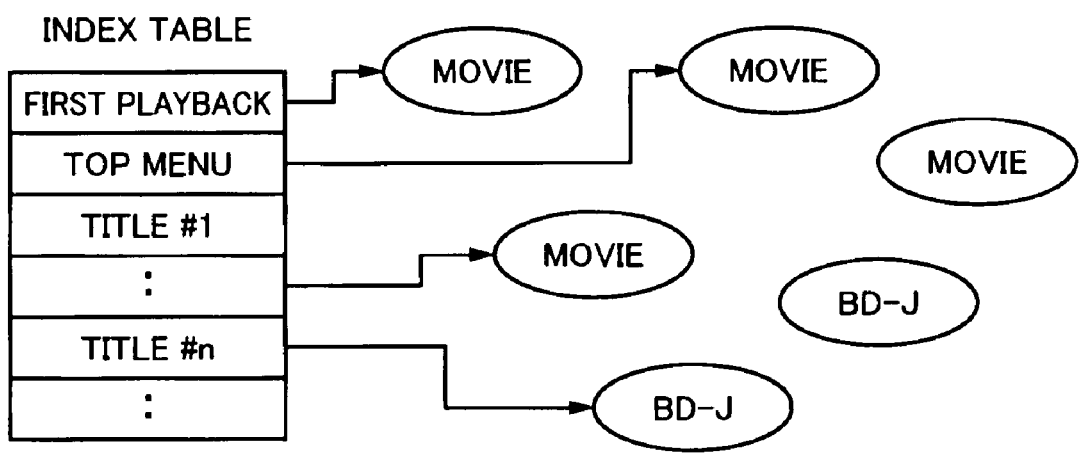
FIG. 3 is a schematic diagram describing an index table.

In other words, as outlined in FIG. 3, any entries in the index table are referred to as titles. A first playback (First Playback), a top menu (Top Menu), and titles (Titles) #1, #2, . . . and so forth as are entries of the index table and titles. Each title represents a link to a movie object or a BD-J object. Each title represents either an HDMV title or a BD-J title.

If content recorded on the BD-ROM is a movie, the first playback is a commercial movie (trailer) of a movie company and is displayed before the main movie. If content is a movie, the top menu is a menu screen on which the user can select the reproduction of the main movie, search for a chapter, set a subtitle and its language, and select the reproduction of a bonus movie and so forth. In addition, the titles may be movies that the user can select from the top menu. The titles may be menu screens.

Figure 4:
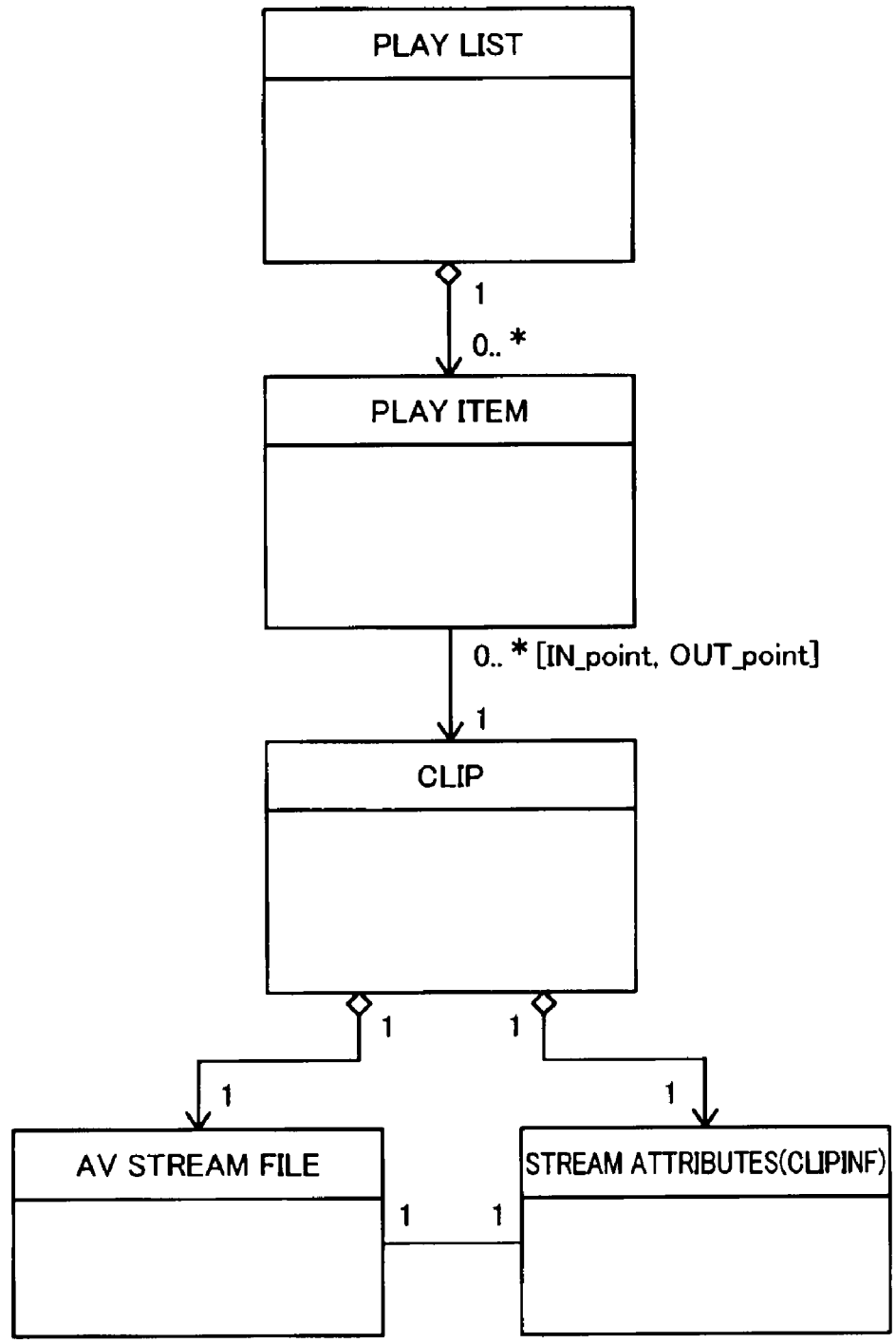
FIG. 4 is an UML diagram showing a relationship of clip AV streams, clip information, clips, play items, and play lists.

FIG. 4 is a unified modeling language (UML) diagram showing a relationship of the foregoing clip AV streams, clip information (Stream Attributes), clips, play items, and play lists. One play list is correlated with one or a plurality of play items. One play item is correlated with one clip. One clip can be correlated with a plurality of play items that differ in start point and/or stop point. One clip refers to one clip AV stream file. Likewise, one clip refers to one clip information file. One clip AV stream file and one clip information file have a relationship of 1 to 1. When such a structure is defined, a nondestructive reproduction order can be represented to reproduce a desired region without necessity of changing the clip AV stream file.

Figure 5:
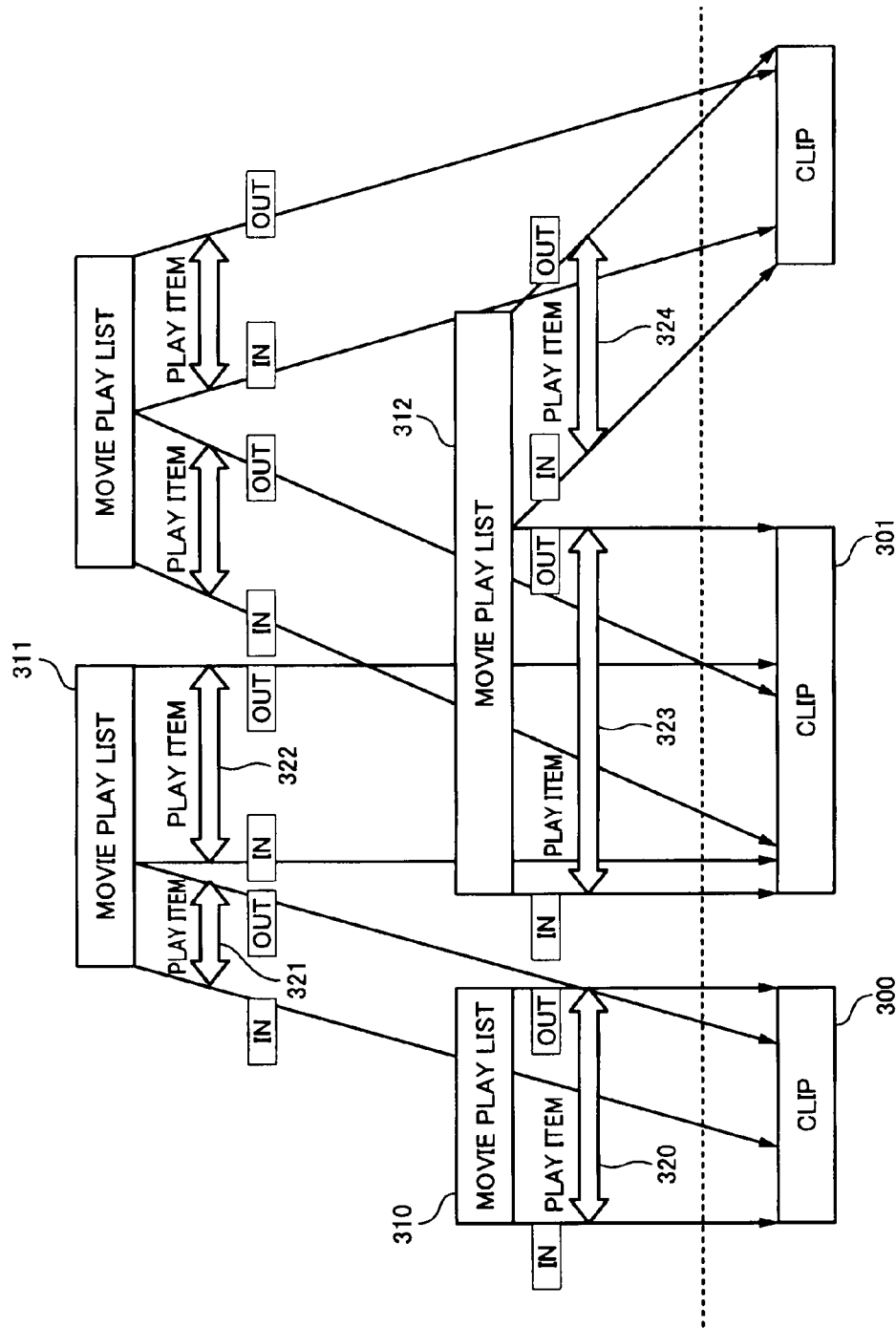
FIG. 5 is a schematic diagram describing a method of referring to the same clip from a plurality of play lists.

In addition, as shown in FIG. 5, a plurality of play lists can refer to the same clip. In addition, a plurality of clips can be represented from one play list. An IN point and an OUT point of a play item of a play list can refer to a clip. In the example shown in FIG. 5, a play item 320 of a play list 310 refers to a clip 300. A play item 321 of a play list 311 that is composed of play items 321 and 322 refers to a region represented by an IN point and an OUT point. A play item 322 of a play list 311 refers to a clip 301 for a region represented by an IN point and an OUT point of a play item 322 and for a region represented by an IN point and an OUT point of a play item 323 of a play list 312 composed of play items 323 and 324.

Figure 6:
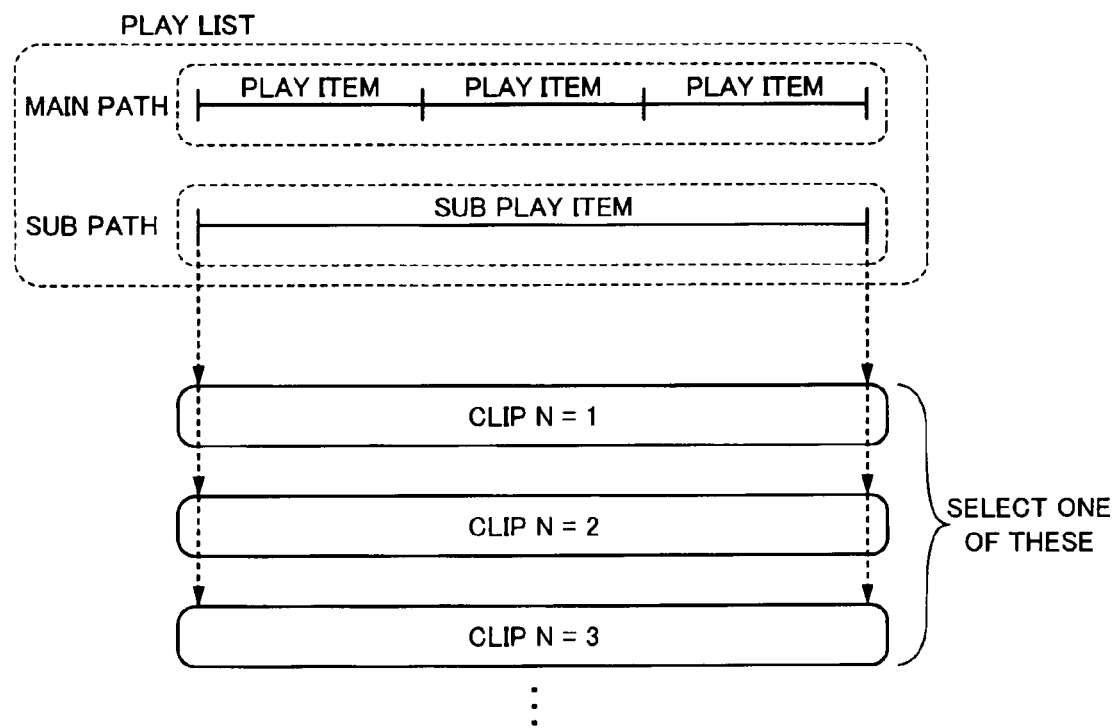
FIG. 6 is a schematic diagram describing a sub path.

As exemplified in FIG. 6, a play list can have a sub path corresponding to a sub play item against a main path corresponding to a play item mainly reproduced (main play item). The sub play item can be correlated with a plurality of clips that differ from each other. The sub play item can selectively refer to one of a plurality of clips correlated therewith. Although details will be omitted, only when a play list satisfies a predetermined condition, the play list can have a sub play item.

A video stream contained in a clip to which a main play item that composes the main path (hereinafter referred to as the primary video stream) refers can be reproduced simultaneously in combination with another stream. Other streams reproduced in combination with the primary video stream include a video stream contained in a clip to which a sub play item that composes the sub path corresponding to the main path (hereinafter referred to as the secondary video stream) refers. The sub path is used to represent a secondary video stream reproduced in synchronization with a primary video stream represented by a main play item, for example, when two pictures are combined.

In the picture-in-picture function, while video data contained in a primary video stream (hereinafter referred to as primary video data) are being reproduced, video data contained in a secondary video stream (hereinafter referred to as secondary video data) can be simultaneously reproduced and superimposed thereon according to a user's operation.

Figure 7:
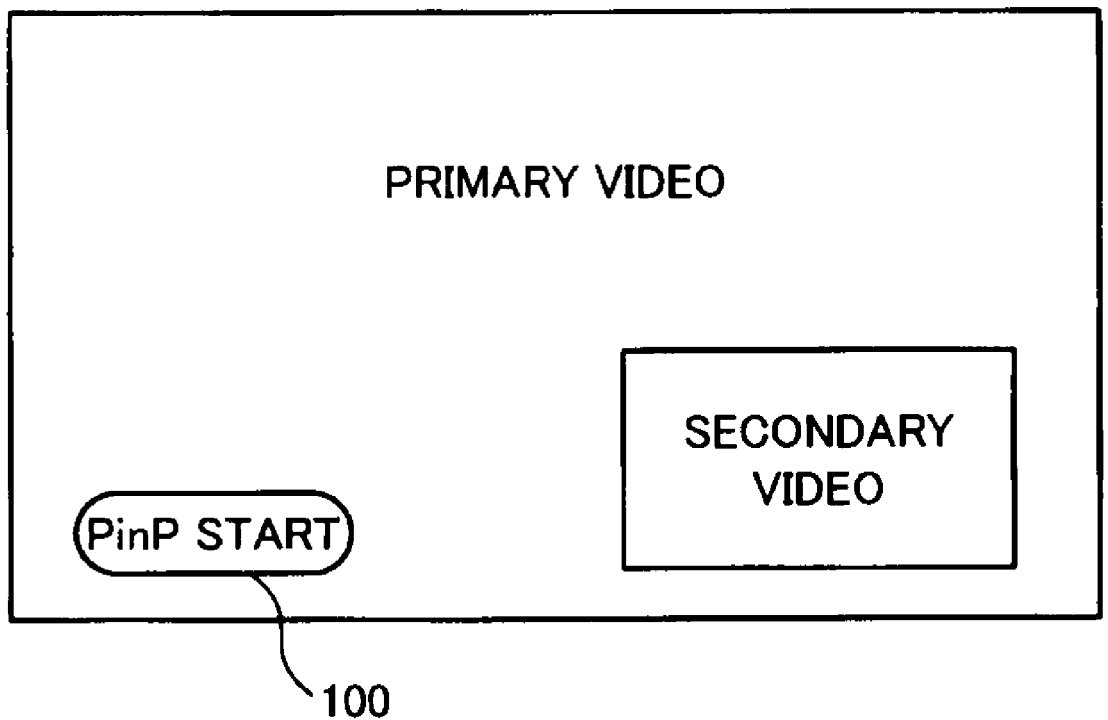
FIG. 7 is a schematic diagram describing the reproduction of video data when a picture-in-picture function is used.

Next, the case of which video data contained in video streams are reproduced from a disc having the foregoing data structure using the picture-in-picture function will be described in brief. As shown in FIG. 7, a picture of primary video data and a picture of secondary video data are displayed, for example, on a display section disposed in an external display apparatus. In addition, an IG menu button 100 that switches between START/STOP of the picture-in-picture function is displayed.

Figure 8:
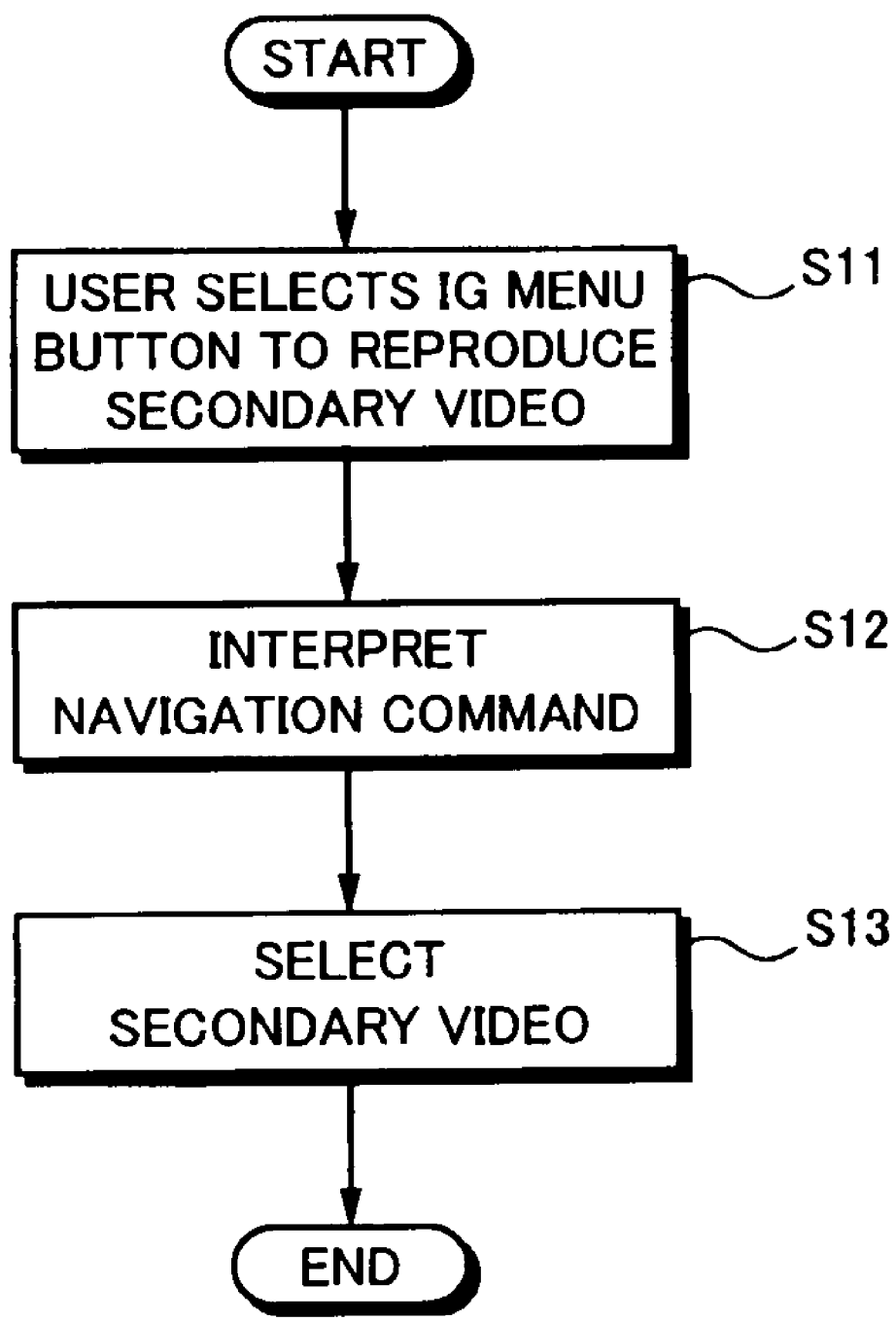
FIG. 8 is a flow chart describing a reproducing process when the picture-in-picture function is used.

In this case, as shown in a flow chart of FIG. 8, when the user operates, for example, a remote control commander and selects the IG menu button 100 for the reproduction of secondary video data (at step S11), a navigation command assigned to the selected IG menu button is interpreted (at step S12). Thereafter, the navigation command assigned to the IG menu button, specifically a command that selects a secondary video stream, is executed. As a result, the corresponding secondary video data are selected and processed (at step S13). When the navigation command is executed, it is decided whether or not to select a secondary video stream before the reproduction starts depending on whether or not the secondary video stream is asynchronous with the primary video stream.

Figure 9:
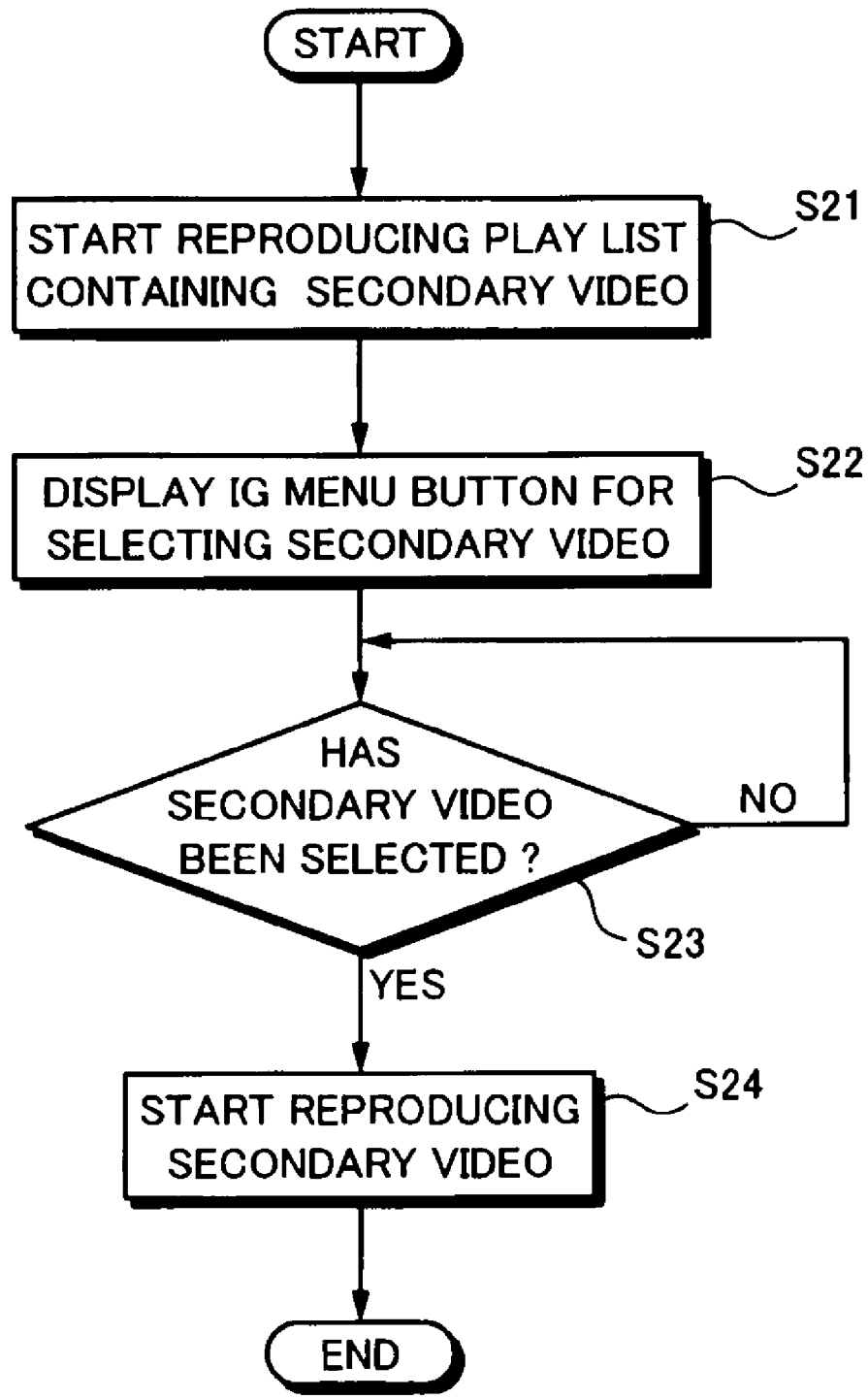
FIG. 9 is another flow chart describing the reproducing process when the picture-in-picture function is used.

As shown in a flow chart of FIG. 9, the reproduction for the play list corresponding to the secondary video data is started (at step S21). Thereafter, the IG menu button 100 to which the navigation command that selects the secondary video data has been assigned is displayed (at step S22). It is determined whether or not the secondary video data have been selected based on the navigation command assigned to the IG menu button 100 (at step S23). When the determined result denotes that the secondary video data have been selected, the reproduction for the secondary video data is started (at step S24). In contrast, when the determined result denotes that the secondary video data have not been selected, it is determined whether or not the secondary video data have been selected.

Next, a video processing method according to this embodiment of the present invention will be described in brief. It is assumed that while primary video data recorded by progressive scanning at a frame frequency of 24 Hz (hereinafter referred to as 24p video data), 24p secondary video data are reproduced at any timing using the picture-in-picture function. In this example, description of portions that do no directly relate to this embodiment of the present invention, such as audio data, will be omitted.

Figure 10A:
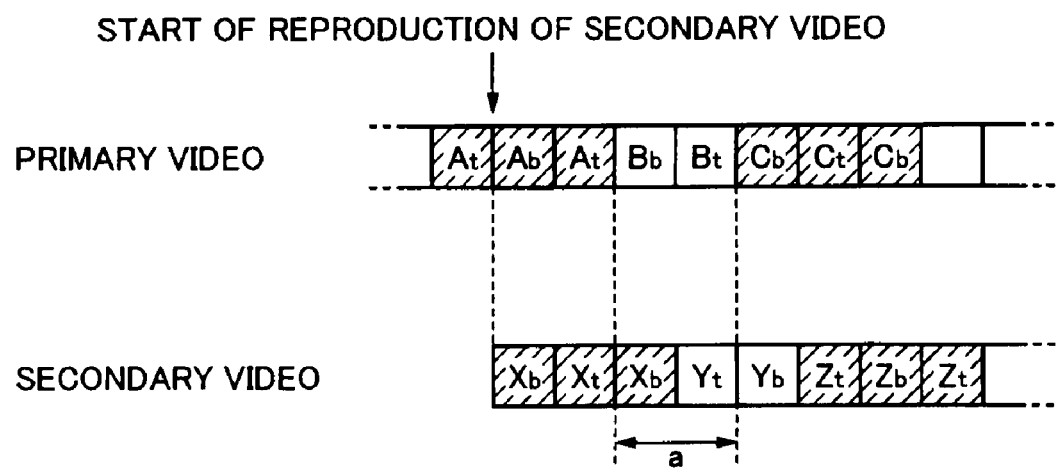
FIG. 10A and FIG. 10B are schematic diagrams describing occurrence of combing.

As shown in FIG. 10A, the 3-2 pull-down process is performed for 24p primary video data to convert them into interlaced scanned primary video data having a frame frequency of 30 Hz (field frequency of 60 Hz) (hereinafter referred to as 60i video data), $A_t$, $A_b$, $A_t$, $B_b$, $B_t$, $C_b$, $C_t$, $C_b$, and so forth. When secondary video data are caused to be reproduced, the 3-2 pull-down process is performed for 24p secondary video data to convert them into 60i secondary video data $X_b$, $X_t$, $X_b$, $Y_t$, $Y_b$, $Z_t$, $Z_b$, $Z_t$, and so forth. "t" and "b" of suffixes of data of each field represent a top field and a bottom field, respectively.

In the 3-2 pull-down process, three successive frames and two successive frames of 24p video data are alternately output. Thus, video data generated in the 3-2 pull-down process have a period of five fields. Hereinafter, a set of n adjacent fields of n successive frames of 24p video data is referred to as a group. A group of three successive fields of three successive fields of 24p video data is referred to as a 3-field group, whereas a group of two adjacent fields of two successive frames of 24p video data is referred to as a 2-field group.

In FIG. 10A, frames of a 3-field group are hatched to identify them from those of a 2-field group. This notation representation applies to similar drawings.

Figure 10B:
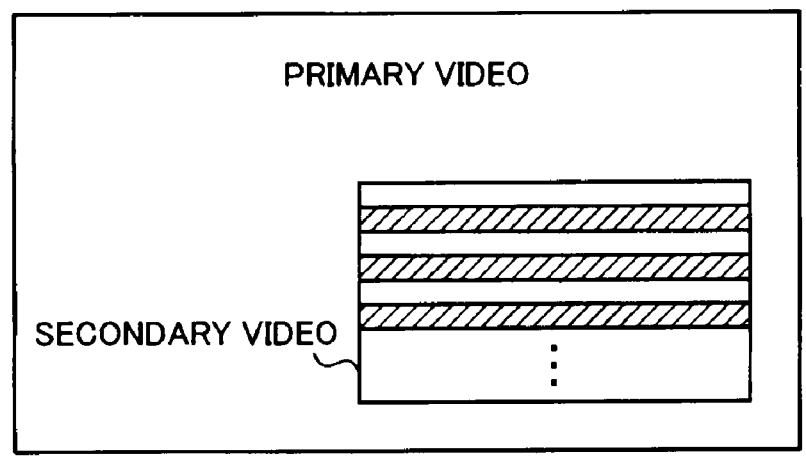

When secondary video data are reproduced at any timing, as shown in FIG. 10A, switching positions of groups of primary video data may be different from those of secondary video data. Thus, for example, in region a, while primary video data $B_b$ and $B_t$ are reproduced in the primary video area, the top field and bottom field of secondary video data reproduced in the secondary video area are $Y_t$ and $X_b$, respectively. In this case, since pictures of the top field and the bottom field are different from each other, so-called combing occurs in the reproduced secondary video data as shown in FIG. 10B.

Three methods can be considered to prevent combing from occurring in secondary video data. In the first method, timing at which the reproduction of secondary video data is caused to start is moved to timing at which a picture of a top field of the next 3-field group generated in the 3-2 pull-down process for the primary video data is output.

In the second method, the remaining number of pictures that have been displayed of a group generated by the 3-2 pull-down process for primary video data that have been reproduced when the reproduction for secondary video data is caused to start is set to the number of pictures that have been displayed of a group generated by the 3-2 pull-down process for the secondary video data such that timing at which a picture of a top field of each group of the primary video data matches that of the secondary video data.

In the third method, while pictures of a group generated by the 3-2 pull-down process for primary video data are being displayed, pictures of a predetermined group of secondary video data are caused to be displayed and at timing of which groups of the primary video data are changed, pictures that are displayed of the secondary video data are changed such that timing at which the primary video data are changed match timing at which the secondary video data are changed.

Figure 11:
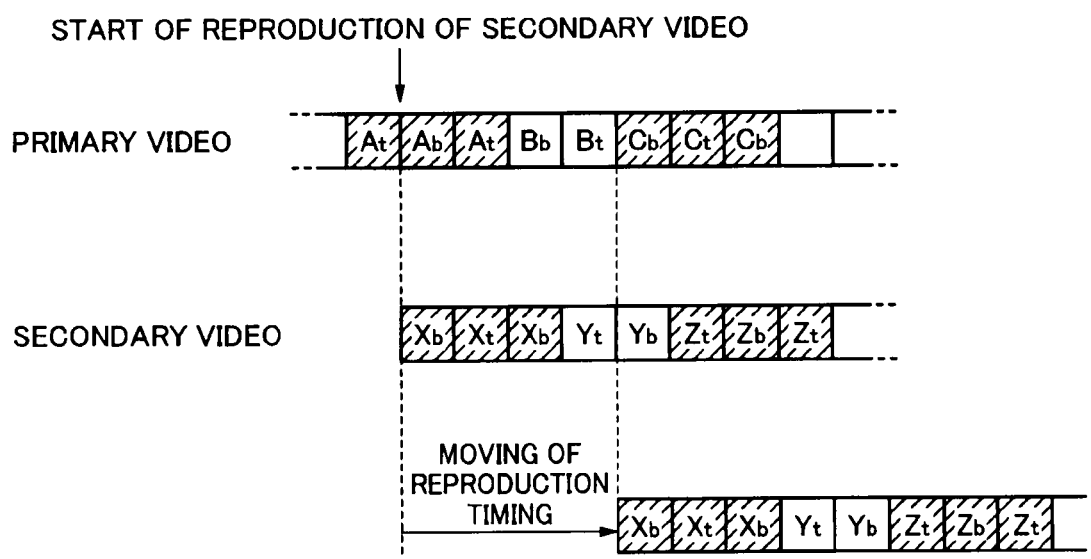
FIG. 11 is a schematic diagram describing a method of preventing combing from occurring according to an embodiment of the present invention.

According to this embodiment of the present invention, the first method is used to prevent combing that occurs when secondary video data are reproduced. For example, as shown in FIG. 11, when timing at which secondary video data are caused to be reproduced does not match timing at which a picture of a top field of a 3-field group of primary video data is output, if the secondary video data are reproduced, since changes of groups of the primary video data do not matched those of the secondary video data, combing occurs when groups of the secondary video data change.

In this case, in the first method, timing at which the reproduction of secondary video data is caused to start is moved by a predetermining value and the secondary video data are reproduced at timing of which a picture of a top field of the next 3-field group of primary video data is output.

Figure 12:
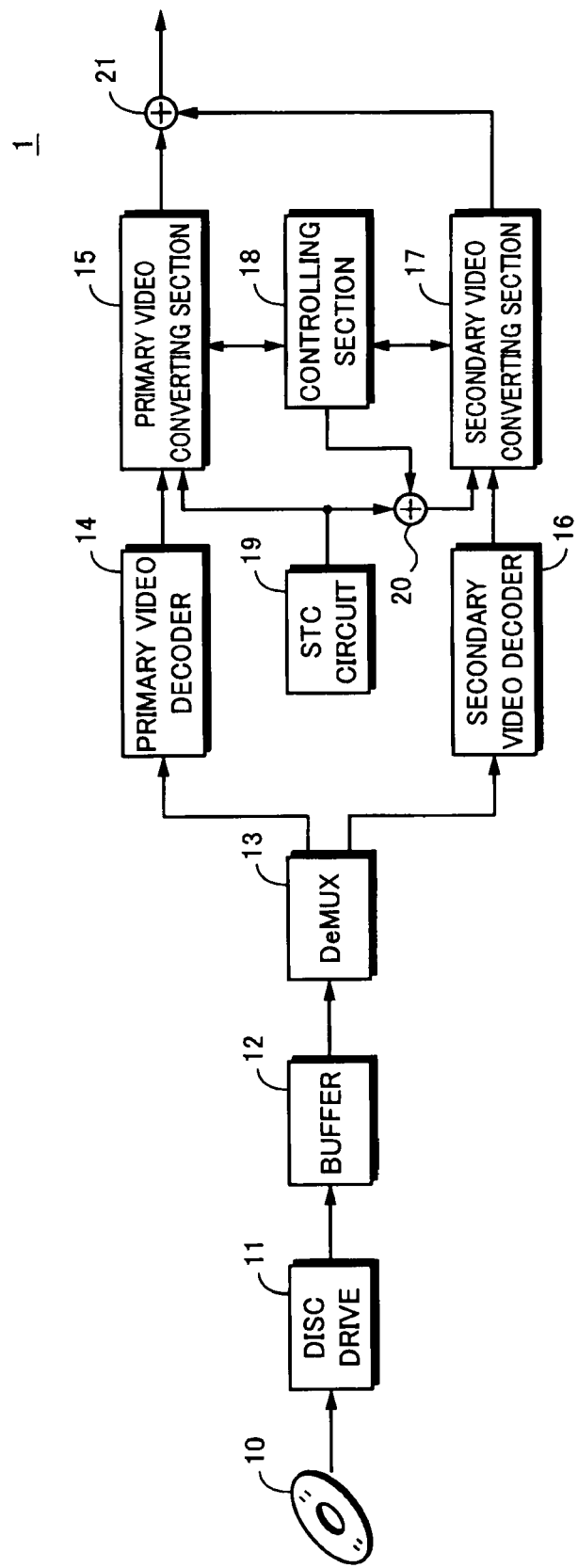
FIG. 12 is a block diagram showing a structure exemplifying a reproducing apparatus according to this embodiment of the present invention.

FIG. 12 shows an outline of a structure exemplifying a reproducing apparatus 1 according to this embodiment of the present invention. There are two types of reproducing apparatus according to this embodiment of the present invention, one of which is an "InMux" type reproducing apparatus that multiplexes a primary video stream and a secondary video stream to the same transport stream such that they synchronize with each other and the other of which is an "OutMux" type reproducing apparatus that multiplexes a primary video stream and a secondary video stream to different transport streams regardless of whether or not they synchronize with each other. In this example, the "InMux" type reproducing apparatus, which multiplexes a primary video stream and a secondary video stream to the same transport stream such that they synchronize with each other, will be described. In the following description, the case of which frame frequencies of video data are to be changed, for example video data having a frame frequency of 24 Hz are converted into video data having a field frequency of 59.94 Hz, will be described.

The reproducing apparatus 1 is composed of a disc drive 11, a buffer 12, a demultiplexer (DeMUX) 13, a primary video decoder 14, a primary video converting section 15, a secondary video decoder 16, a secondary video converting section 17, a controlling section 18, a system time clock (STC) circuit 19, and adding devices 20 and 21.

Stream data are recoded on a detachable record medium 10 that is supplied to the user. The record mediums 10 may include a read-only or recordable disc-shaped record medium, a semiconductor memory such as a flash memory, and a detachable hard disk. The disc-shaped record mediums may include a Blu-ray Disc (registered trademark) and a Blu-ray Disc read-only memory (BD-ROM) based on the Blu-ray Disc read-only standard, a digital versatile disc (DVD), and a compact disc (CD).

Stream data sources may include a communication network such as the Internet and a digital television broadcast besides the disc-shaped record mediums. In the following description, it is assumed that the stream data source is a detachable record medium 10 such as a disc-shaped record medium.

The disc drive 11 reproduces stream data from the loaded record medium 10. Recorded on the detachable record medium 10 are stream data in which video data and audio data have been multiplexed as a transport stream (TS) or a program stream (PS) defined, for example, in the Moving Picture Experts Group 2 Systems (MPEG2 System). A transport stream or a program stream reproduced from the record medium 10 is supplied to the buffer 12. The buffer 12 supplies the stream data to the demultiplexer 13 under the control of the controlling section 18 that will be described later.

The demultiplexer 13 demultiplexes a primary video stream and a secondary video stream from the supplied stream data. If stream data have been supplied as a transport stream from the buffer 12, the demultiplexer 13 analyzes the packet identification (PID) of each transport packet and collects packets for primary video data. Packetized elementary stream (PES) packets are reconstructed from data stored in payloads of the collected packets. An elementary stream of primary video data is obtained from each PES packet and thereby a primary video stream is restored. Like primary video stream, the demultiplexer 13 collects packets of secondary video data from transport packets based on their PIDs and thereby restores a secondary video stream.

If stream data of a program stream have been supplied from the buffer 12, the demultiplexer 13 separates PES packets from the stream data based on header information of pack headers or the like, extracts an elementary stream of video data from PES packets based on information stored in headers of the PES packets, and restores a video stream. Like video stream, the demultiplexer 13 separates PES packets from the stream data based on header information such as pack headers and restores an audio stream.

The primary video stream separated by the demultiplexer 13 is supplied to the primary video decoder 14 and the secondary video stream to the secondary video decoder 16. The primary video decoder 14 decodes the supplied primary video stream and outputs base-band video data.

As mentioned above, the encoding system for a video stream transmitted is not limited to the MPEG2 System. Encoding systems for a video stream include those specified in International Telecommunication Union-Telecommunication Standardization Sector (ITU-T) Recommendation H.264, International Organization for Standardization (ISO)/International Electrotechnical Commission (IEC) International Standard 14496-10 (MPEG-4 part 10) Advanced Video Coding (hereinafter referred to as MPEG4 AVC), and Video Codec 1 (VC-1) System. A video stream encoded in such a system can be transmitted according to the MPEG2 System.

The primary video decoder 14 can decode a primary video stream according to each of these encoding formats. In this case, the primary video decoder 14 determines the encoding format based on, for example, header information of the primary video stream and attribute information added to the primary video stream in a predetermined manner and decodes the primary video stream according to the determined decoding system. An encoding format may be set by an external control based on user's operation or the like.

Of course, the primary video decoder 14 may deal with only a single encoding format. In this case, if the primary video decoder 14 is supplied with a video stream having been encoded in an encoding format it is unable to deal therewith, for example an error process is performed.

In addition, the primary video decoder 14 obtains the frame rate, namely the frame frequency, of the supplied primary video stream. For example, according to the foregoing MPEG2 System, MPEG4 AVC System, and VC-1 System, information regarding the frame rate is stored in the header portion of the stream. The primary video decoder 14 extracts information regarding the frame rate, for example, from the header portion of the supplied primary video stream and obtains the frame rate of the video stream therefrom.

More specifically, according to the MPEG2 System, frame rate frame_rate_value is described in data item frame_rate_code of a sequence header. According to the MPEG4 AVC System, frame rate frame_rate_value is obtained by calculating (time_scale/num_units_in_tick)/2 using parameter num_units_in_tick and parameter time_scale of sequence parameter vui_parameters( ) of a sequence parameter set. According to the VC-1 System, frame rate frame_rate_value is obtained by calculating (value of Frame Rate Numerator)/(value of Frame Rate Denominator) using value "value of Frame Rate Numerator" and value "value of Frame Rate Denominator" represented by item FRAMERATENR and item FRAMERATEDR of sequence layer SEQUENCELAYER( ).

Primary video data into which a primary video stream has been decoded and frame rate information that has been obtained from the primary video stream in a predetermined manner are supplied from the primary video decoder 14 to the primary video converting section 15. The primary video data are supplied to the primary video converting section 15, for example, at the frame rate of the video data.

Like the primary video decoder 14, the secondary video decoder 16 can decode a primary video stream according to each of the plurality of encoding formats. In addition, the secondary video decoder 16 extracts information regarding the frame rate stored in the header portion of the supplied secondary video stream and obtains the frame rate of the video stream.

Secondary video data into which the secondary video stream has been decoded and the frame rate information that has been obtained from the secondary video stream in a predetermined manner are supplied from the secondary video decoder 16 to the secondary video converting section 17. The secondary video data are supplied to the secondary video converting section 17, for example, at the frame rate of the video data.

The STC circuit 19 generates an STC that is a synchronous reference signal that causes primary video data and secondary video data to synchronize with each other. The generated STC is supplied to the secondary video converting section 17 through the primary video converting section 15 and the adding device 20.

The controlling section 18 is composed of a central processing unit (CPU), a read-only memory (ROM), a random access memory (RAM), and so forth. The ROM pre-stores a program that is executed on the CPU and data necessary for operation. The RAM is used as a work memory of the CPU. The CPU reads the program and data from the ROM when necessary and controls each section of the reproducing apparatus 1 using the RAM as a work memory. The program and data stored in the ROM can be rewritten and updated.

The controlling section 18 controls the STC circuit 19 to delay the STC value supplied to the secondary video converting section 17 by a predetermined value through the adding device 20 such that the secondary video data that are output are delayed by the predetermined value.

Figure 13A:
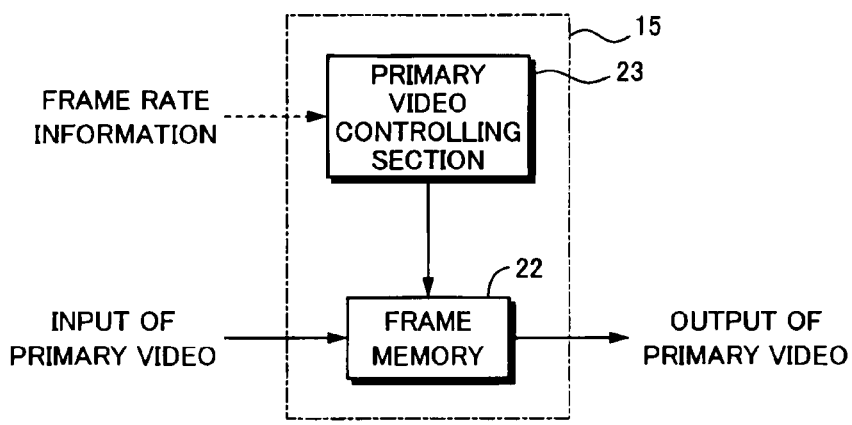
FIG. 13A and FIG. 13B are block diagrams showing structures exemplifying a primary video converting section and a secondary video converting section.

The primary video converting section 15 converts the frame frequency of primary video data based on the frame rate information supplied from the primary video decoder 14. For example, as shown in FIG. 13A, the primary video converting section 15 is composed of a frame memory 22 and a primary video controlling section 23. The primary video controlling section 23 controls reading of the primary video data from the frame memory 22 under the control of the controlling section 18 to perform those including the 3-2 pull-down process.

In the 3-2 pull-down process, which converts, for example, 24p primary video data into 60i primary video data, 24p primary vide data, namely primary video data supplied at a frame frequency of 24 Hz, are stored in the frame memory 22 for each frame and the primary video controlling section 23 controls reading of successive three frames or successive two frames from the frame memory 22.

The converted primary video data are output only when the STC value as the synchronous reference signal supplied from the STC circuit 19 matches a time represented by a presentation time stamp (PTS) of the primary video data. The PTS is a time stamp that represents a reproduction time of a picture or a sound as 33 bits of a 90 kHz clock value. The PTS is added to each reproduction unit that is called an access unit. The PTS is added to the header portion of a packet that stores a top portion of the access unit.

Like the primary video converting section 15, the secondary video converting section 17 converts the frame frequency of the secondary video data based on the frame rate information supplied from the secondary video decoder 16. The secondary video converting section 17 converts the size of the secondary video data.

Figure 13B:
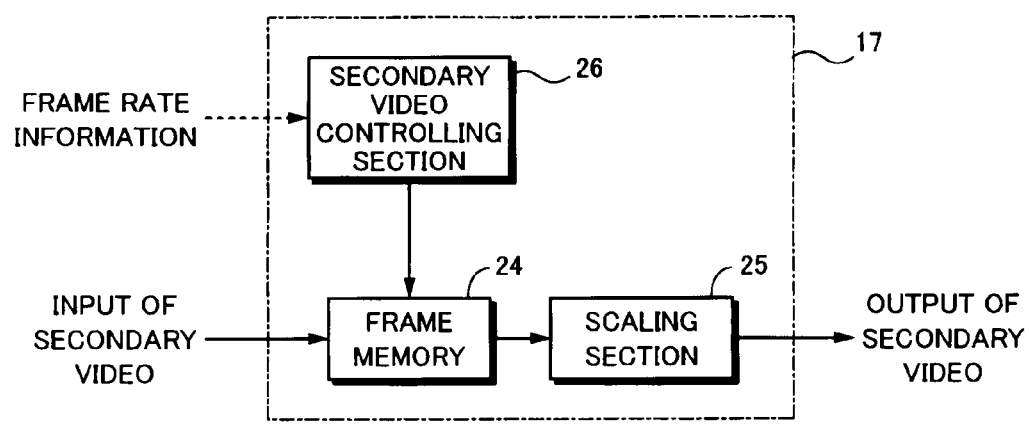

For example, as shown in FIG. 13B, the secondary video converting section 17 is composed of a frame memory 24, a scaling section 25, and a secondary video controlling section 26. The secondary video controlling section 26 controls reading of secondary video data from the frame memory 24 under the control of the controlling section 18 to perform those including the 3-2 pull-down process.

The secondary video data that are output from the frame memory 24 are supplied to the scaling section 25. The scaling section 25 converts the size of the secondary video data to a predetermined size under the control of the secondary video controlling section 26 and outputs the resultant secondary video data. Specifically, for example, the scaling section 25 converts the size of the secondary video data such that the size of the secondary video data becomes 1 fold, 1.5 fold, ½ fold, or ¼ fold the original size. The scaling section 25 may be able to convert the size of the supplied secondary video data to the size of the full screen.

Returning to FIG. 12, the adding device 21 combines the primary video data that are output from the primary video converting section 15 and the secondary video data that are output from the secondary video converting section 17 for each frame and outputs the combined video data.

It was assumed that each section of the reproducing apparatus 1 shown in FIG. 12 is composed of hardware. However, this embodiment of the present invention is not limited to such an example. In other words, all or part of the demultiplexer 13, the primary video decoder 14, the primary video converting section 15, the secondary video decoder 16, the secondary video converting section 17, the controlling section 18, and the STC circuit 19 of the reproducing apparatus 1 may be structured by executing a predetermined program on the CPU. Instead, the program may be pre-stored in a ROM (not shown) of the reproducing apparatus 1. Instead, the program may be provided as a record medium such as a DVD-ROM or a CD-ROM. Instead, the program may be provided through a communication network such as the Internet. The provided program is stored in a hard disk drive (not shown) of the reproducing apparatus 1 and then read and executed by the CPU.

Next, combinations of primary video data and secondary video data combined when the picture-in-picture function is used will be described. Encoding formats for primary video data and secondary video data include the MPEG2 System, MPEG4 AVC System, and VC-1 System as described above. When primary video data and secondary video data are combined using the picture-in-picture function, combinations of primary video data and secondary video data have been set.

For example, as shown in FIG. 14, primary video data encoded according to the MPEG2 System can be combined with secondary video data encoded according to any of the MPEG2 System, the MPEG4 AVC System, and the VC-1 System. On the other hand, primary video data encoded according to the MPEG4 AVC System can be combined with secondary video data encoded according to only the MPEG4 AVC System. On the other hand, primary video data encoded according to the VC-1 System can be combined with secondary video data encoded according to only the VC-1 System.

Likewise, combinations of sizes, frame rates, and scanning systems of primary video data and secondary video data that can be combined have been set. For example, as shown in FIG. 15, primary video data whose the picture size (horizontal size×vertical size) is 1920×1080 [pixels] and that are interlaced scanned at a frame rate of 29.97 [Hz] can be combined with secondary video data whose picture size is 720×480 [pixels], 1920×1080 [pixels], or 1440×1080 [pixels] and that are interlaced scanned at a frame rate of 29.97 [Hz].

Next, a reproducing method according to this embodiment of the present invention will be described.

According to this embodiment of the present invention, when secondary video data are reproduced using the picture-in-picture function, control is performed such that timing at which the reproduction of the secondary video data starts matches timing at which a picture of a top field of a 3-field group of primary video data is displayed.

Figure 16:
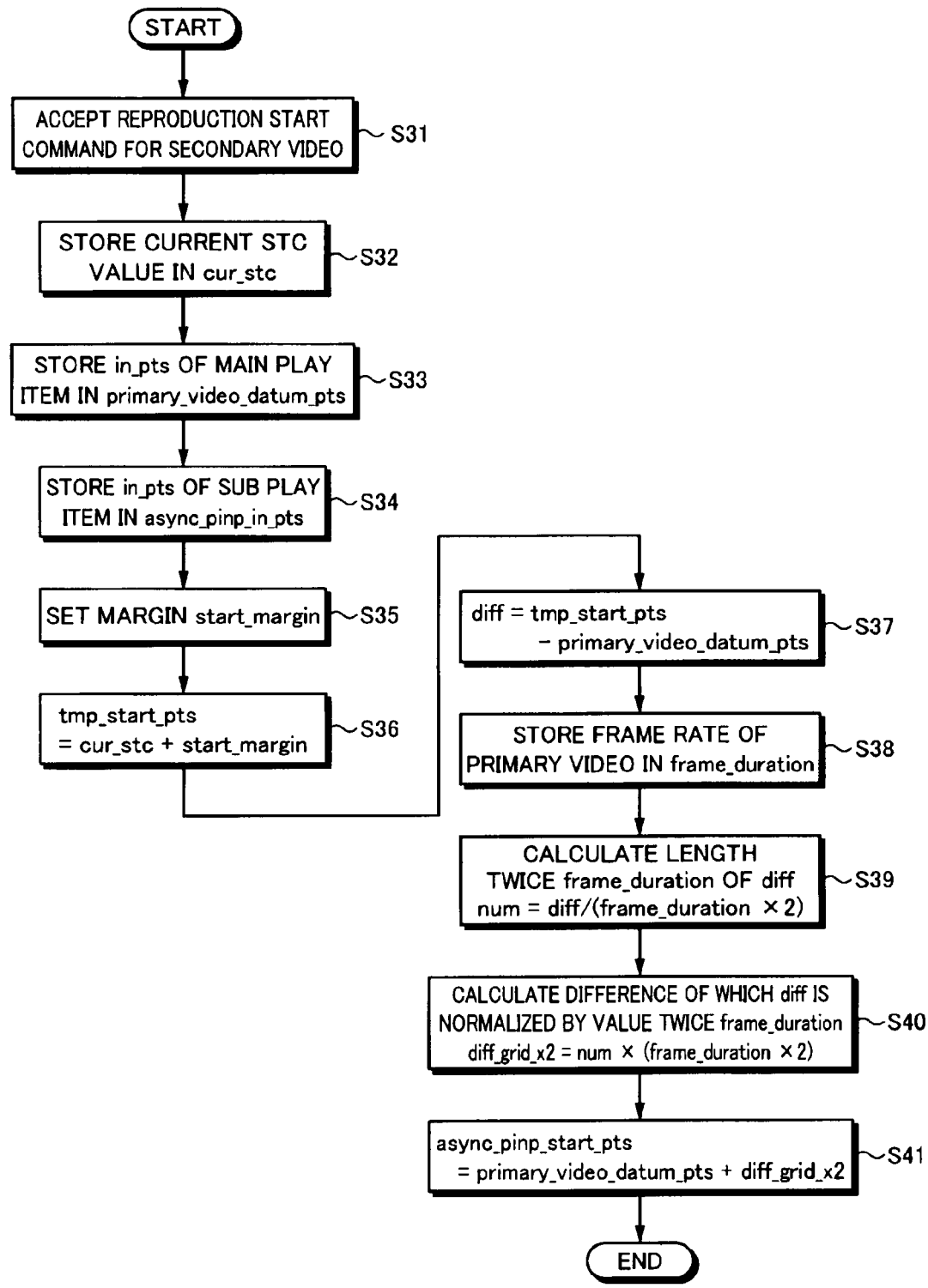
FIG. 16 is a flow chart describing a process that calculates reproduction start timing of secondary video data according to this embodiment of the present invention.

Next, with reference to a flow chart of FIG. 16, a process that calculates timing at which the reproduction of secondary video data starts will be described. The process exemplified in FIG. 16 is mainly performed by the controlling section 18 of the reproducing apparatus 1.

At step S31, the user operates the remote control commander or the like to start reproducing secondary video data. At step S32, the STC value at timing of which the reproduction of the secondary video data starts is obtained and stored in value cur_stc that represents the current STC value.

Thereafter, at step S33, value in_pts that represents an IN point of a main play item corresponding to the primary video data represented by the current STC value cur_stc is obtained and stored in value primary_video_datum_pts. At step S34, value in_pts, which represents an IN point of a sub play item corresponding to the secondary video data, is obtained and stored in value async_pinp_in_pts.

At step S35, a predetermined value, for example value "300×90" corresponding to around 300 msec is stored in value start_margin that represents a margin for which the reproduction of the secondary video data starts a predetermined time after the current time. This value represents a value of which 300 msec is converted regarding 90 kHz of the STC clock.

At step S36, PTS value tmp_start_pts that represents a temporary reproduction start position of secondary video data is calculated based on margin start_margin for which the reproduction of the secondary video data starts according to formula (1).

$$\text{tmp\_start\_pts} = \text{cur\_stc} + \text{start\_margin} \quad (1)$$

Thereafter, at step S37, difference diff of the PTS values that represent the reproduction start positions of the primary video data and the secondary video data is calculated based on PTS value primary_video_datum_pts that represents the reproduction start position of the primary video data and PTS value tmp_start_pts that represents the temporary reproduction start position of the secondary video data according to formula (2).

$$\text{diff} = \text{tmp\_start\_pts} - \text{primary\_video\_datum\_pts} \quad (2)$$

At step S38, the frame rate of the primary video data is obtained and stored in value frame_duration. At step S39, the length twice frame rate frame_duration of the primary video data contained in difference diff of the PTS values, which represent the reproduction start positions of the primary video data and secondary video data, calculated at step S37, is calculated according to formula (3) and the integer part of the calculated result is stored in value num.

$$\text{num} = \text{diff} / (\text{frame\_duration} \times 2) \quad (3)$$

At step S40, difference diff_grid_x2 of which difference diff of the PTS values, which represent the reproduction start positions of the primary video data and the secondary video data, is normalized with a value twice frame rate frame_duration of the primary video data is calculated according to formula (4). This difference diff_grid_x2 becomes a delay value of the STC value supplied from the controlling section 18 to the adding device 20 against the STC value supplied from the STC circuit 19.

$$\text{diff\_grid\_x2} = \text{num} \times (\text{frame\_duration} \times 2) \quad (4)$$

At step S41, PTS value async_pinp_start_pts that represents the reproduction start time of the secondary video data is calculated according to formula (5). In other words, the secondary video data are caused to be reproduced from the start position of combinations of 3-field groups and 2-field groups generated when the 3-2 pull-down process is performed for the primary video data.

$$\text{async\_pinp\_start\_pts} = \text{primary\_video\_datum\_pts} + \text{diff\_grid\_x2} \quad (5)$$

Figure 17:
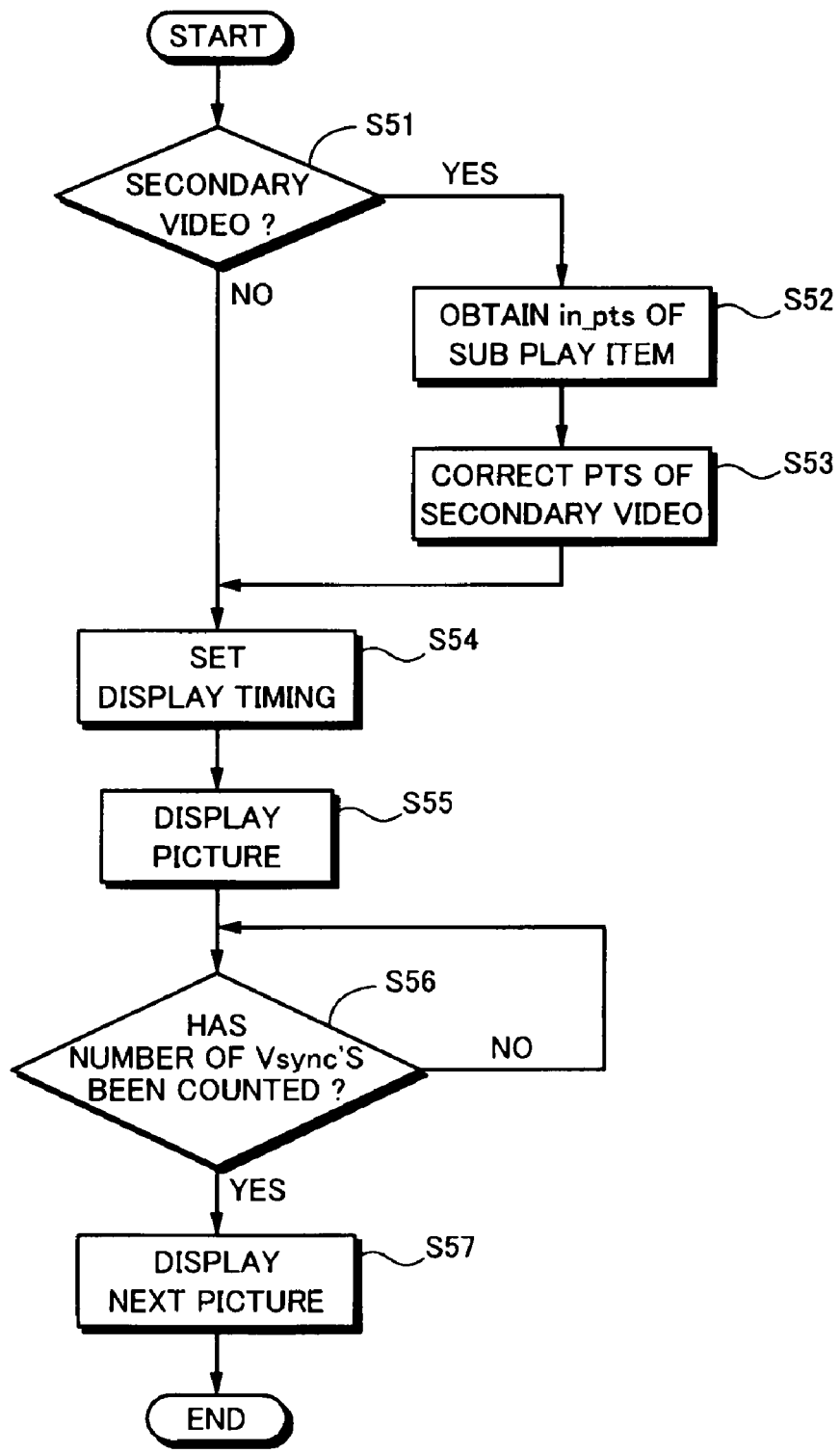
FIG. 17 is a schematic diagram describing the reproducing process according to this embodiment of the present invention.

Next, with reference to a flow chart shown in FIG. 17, the reproducing process according to this embodiment of the present invention will be described. At step S51, it is determined whether or not video data to be processed are secondary video data. When the determined result denotes that the video data to be treated are secondary video data, the flow advances to step S52.

At step S52, in_pts of a sub play item corresponding to the secondary video data is obtained. At step S53, in_pts obtained at step S52 is subtracted from the PTS of the secondary video data and then async_pinp_start_pts is added to the subtracted result to correct the PTS of the secondary video data. Thereafter, the flow advances to step S54.

In contrast, when the determined result at step S51 denotes that the video data to be processed are not secondary video data, namely primary video data, the flow advances to step S54.

At step S54, a time represented by the PTS of the video data and the STC value are compared to set timing at which the video data are displayed. When the video data to be processed are secondary video data, the PTS value that has been corrected at step S53 is used. When the time represented by the PTS of the video data matches the STC value at step S55, a picture is displayed.

Thereafter, at step S56, the number of Vsync's is counted based on value prsn_vsync_cnt that represents the number of Vsync's for pictures that have been displayed and it is determined whether or not pictures have been displayed for the number of Vsync's. When the determined result denotes that pictures have been displayed for value prsn_vsync_cnt, which represents the number of Vsync's, the flow advances to step S57. At step S57, the next picture is displayed. The method of calculating prsn_vsync_cnt, which represents the number of Vsync's, will be described later.

In contrast, when the determined result denotes that pictures have not been displayed for prsn_vsync_cnt, which represents the number of Vsync's, the flow returns to step S56. At step S56, it is determined whether or not pictures have been displayed for prsn_vsync_cnt, which represents the number of Vsync's.

Figure 18:
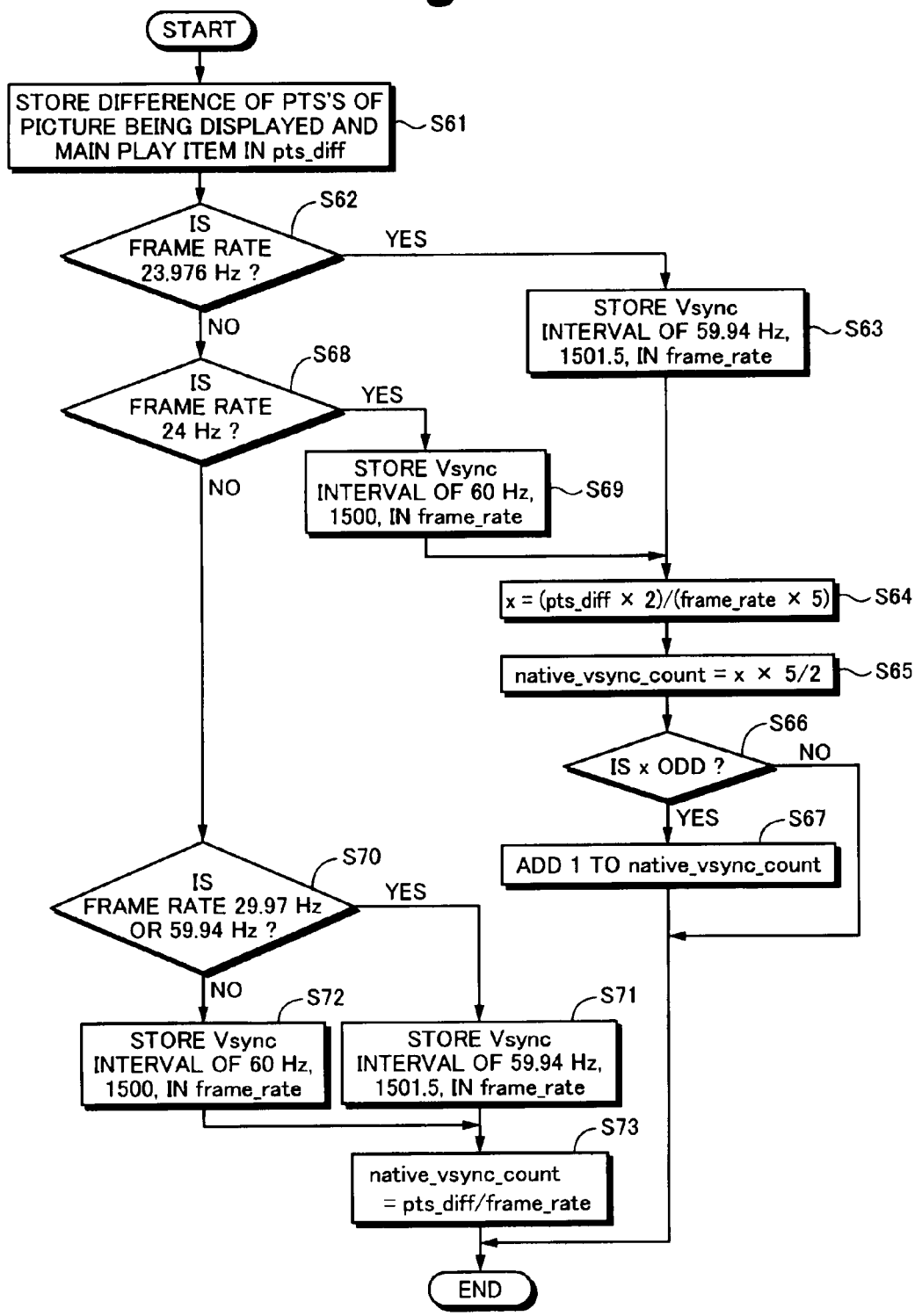
FIG. 18 is a flow chart describing a calculating process for value native_vsync_count representing the original number of Vsync's for pictures that have been displayed.

Next, the method of calculating value prsn_vsync_cnt, which represents the number of Vsync's for pictures that have been displayed, used at the foregoing step S56 will be described. With reference to a flow chart shown in FIG. 18, the process that calculates native_vsync count, which represents the original number of Vsync's for pictures that have been displayed, will be described. At step S61, the difference between the PTS value of a picture that is being displayed and the PST value of a main play item is stored in value pts_diff.

Thereafter, at step S62, it is determined whether or not the frame rate of the picture that is being displayed is 23.976 Hz. When the determined result denotes that the frame rate of the picture that is being displayed is 23.976 Hz, the flow advances to step S63. At step S63, a value that represents the Vsync interval of 59.94 Hz is stored in frame_rate. The value stored in frame_rate is for example a value converted regarding 90 kHz of the STC clock. Specifically, "90 kHz/59.94 Hz=1501.5" is stored in frame_rate.

At step S64, value x is calculated according to formula (6) and the integer part of the calculated result is stored in value x. At step S65, value native_vsync_count that represents the original number of Vsync's for pictures that have been displayed is calculated according to formula (7) and the integer part of the calculated result is stored in value native_vsync_count.

$$x = (pts\_diff \times 2)/(frame\_rate \times 5) \qquad (6)$$

$$native\_vsync\_count = x \times 5/2 \qquad (7)$$

At step S66, it is determined whether or not value x calculated at step S64 is odd. When the determined result denotes that value x is odd, the flow advances to step S67. At step S67, "1" is added to the value of native_vsync_count calculated at step S65 and then the process is complete. When the determined result denotes that value x is not odd, namely even, the process is complete.

In contrast, when the determined result at step S62 denotes that the frame rate of the picture that is being displayed is not 23.976 Hz, the flow advances to step S68. At step S68, it is determined whether or not the frame rate of the picture that is being displayed is 24 Hz. When the determined result denotes that the frame rate of the picture that is being displayed is 24 Hz, the flow advances to step S69. At step S69, a value that represents the Vsync interval of 60 Hz is stored in frame_rate. The value that is stored in value frame_rate is a value converted regarding 90 kHz of the clock of the STC. Specifically "90 kHz/60 Hz=1500" is stored in value frame_rate.

In contrast, when the determined result at step S69 denotes that the frame rate of the picture that is being displayed is not 24 Hz, the flow advances to step S70. At step S70, it is determined whether or not the frame rate of the picture that is being displayed is 29.97 Hz or 59.94 Hz. When the determined result denotes that the frame rate of the picture that is being displayed is 29.97 Hz or 59.94 Hz, the flow advances to step S71.

At step S71, a value that represents the Vsync interval of 59.94 Hz is stored in frame_rate. The value stored in value frame_rate is a value converted regarding 90 kHz of the clock of the STC. Specifically, "190 kHz/59.94 Hz=1501.5" is stored in value frame_rate.

In contrast, when the determined result at step S70 denotes that the frame rate of the picture that is being displayed is neither 29.97 Hz nor 59.94 Hz, the flow advances to step S72. At step S72, a value that represents the Vsync interval of 60 Hz is stored. The value stored in frame_rate is a value converted regarding 90 kHz of the clock of the STC. Specifically, "90 kHz/60 Hz=1500" is stored in frame_rate.

At step S73, value native_vsync_count that represents the original number of Vsync's for pictures that have been displayed is calculated according to formula (8).

$$native\_vsync\_count = pts\_diff/frame\_rate \qquad (8)$$

Figure 19:
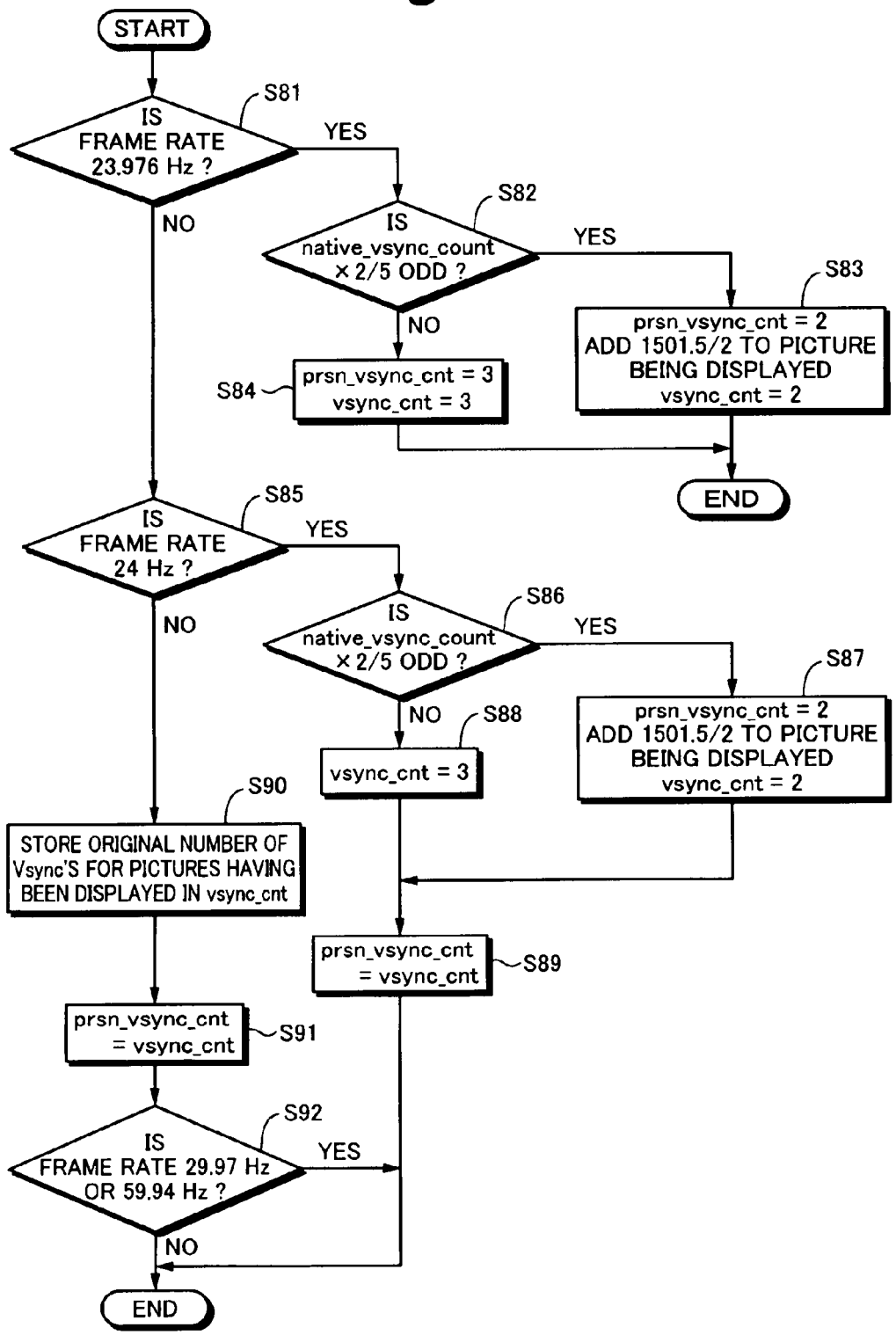
FIG. 19 is a flow chart describing a calculating process for value prsn_vsync_cnt representing the number of Vsync's for pictures that have been displayed.

Next, with reference to a flow chart shown in FIG. 19, the process that calculates value prsn_vsync_cnt that represents the number of Vsync's for pictures that have been displayed will be described. At step S81, it is determined whether or not the frame rate of the picture that is being displayed is 23.976 Hz. When the determined result denotes that the frame rate of the picture that is being displayed is 23.976 Hz, the flow advances to step S82.

At step S82, it is determined whether or not a value of which value native_vsync_count, which represents the original number of Vsync's for pictures that have been displayed, is multiplied by ⅖ is odd.

When the determined result represents that the result is odd, the flow advances to step S83. At step S83, "2" is set to value prsn_vsync_cnt that represents the number of Vsync's for pictures that have been displayed, "1501.5/2" is added to the PTS of the picture that is being displayed, and "2" is set to value vsync_cnt.

In contrast, when the determined result denotes that the value of which value native_vsync_count, which represents the original number of Vsync's for pictures that have been displayed, is multiplied by ⅖ is not odd, the flow advances to step S84. At step S84, "3" is set to value prsn_vsync_cnt, which represents the number of Vsync's for pictures that have been displayed, and "3" is set to value vsync_cnt.

When the determined result at step S81 denotes that the frame rate of the picture that is being displayed is not 23.976 Hz, the flow advances to step S85. At step S85, it is determined whether or not the frame rate of the picture that is being displayed is 24 Hz. When the determined result denotes that the frame rate of the picture that is being displayed is 24 Hz, the flow advances to step S86.

At step S86, it is determined whether or not a value of which value native_vsync_count, which represents the original number of Vsync's for pictures that have been displayed, is multiplied by ⅖ is odd.

When the determined result denotes that the result is odd, the flow advances to step S87. At step S87, "2" is set to value prsn_vsync_cnt that represents the number of Vsync's for pictures that have been displayed, "1501.5/2" is added to the PTS of the picture that is being displayed, and "2" is set to value vsync_cnt.

In contrast, when the determined result at step S86 denotes that the result of which value native_vsync_count, which represents the original number of Vsync's for pictures that have been displayed, is multiplied by ⅖ is not odd, the flow advances to step S88. At step S88, "3" is set to value vsync_cnt.

At step S89, value vsync_cnt decided at step S87 or S88 is stored in value prsn_vsync_cnt that represents the number of Vsync's for pictures that have been displayed and then the process is complete.

In contrast, when the determined result at step S85 denotes that the frame rate of the picture that is being displayed is not 24 Hz, the flow advances to step S90. At step S90, the original number of Vsync's for pictures that have been displayed is stored in value vsync_cnt according to the specifications of the video decoder. At step S91, value vsync_cnt decided at step S90 is stored in value prsn_vsync_cnt, which represents the number of Vsync's for pictures that have been displayed.

At step S92, it is determined whether or not the frame rate of the picture that is being displayed is 29.97 Hz or 59.94 Hz. When the determined result denotes that the frame rate of the picture that is being displayed is 29.97 Hz or 59.94 Hz, the process is complete. Likewise, when the determined result denotes that the frame rate of the picture that is being displayed is neither 29.97 Hz nor 59.94 Hz, the process is complete.

Thus, according to this embodiment of the present invention, timing at which the reproduction of secondary video data starts is calculated. By matching this timing with timing at which a top field of a 3-field group generated by the 3-2 pull-down process for the primary video data is output next time, combing that occurs when the secondary video data are reproduced can be prevented.

Next, a first modification of this embodiment of the present invention will be described. According to the first modification of this embodiment of the present invention, the foregoing second method is used to prevent combing that occurs when secondary video data are reproduced.

In the second method, the remaining number of pictures that have been displayed of a group generated by the 3-2 pull-down process for primary video data that have been reproduced when the reproduction for secondary video data is caused to start is set to the number of pictures that have been displayed of a group generated by the 3-2 pull-down process for the secondary video data such that timing at which a picture of a top field of each group of the primary video data matches that of the secondary video data.

Figure 20:
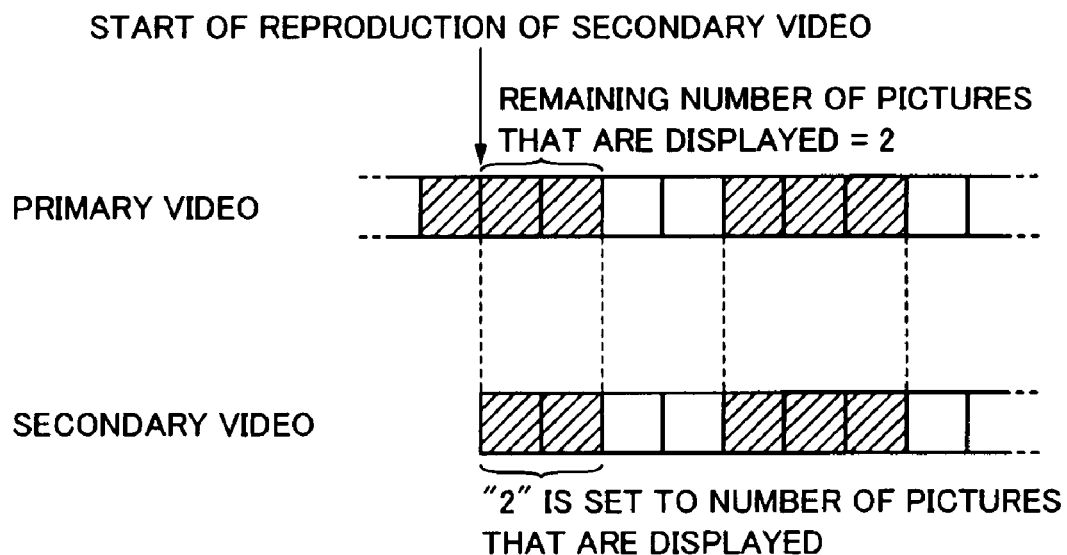
FIG. 20 is a schematic diagram describing a reproducing method according to a first modification of this embodiment of the present invention.

For example, as shown in FIG. 20, since the remaining number of pictures of a group of primary video data when the reproduction of secondary video data is caused to start is "2", "2" is set to the number of pictures displayed of the first group of the secondary video data. Thus, timing at which groups of the primary video data are changed matches timing at which groups of the secondary video data are changed.

Figure 21:
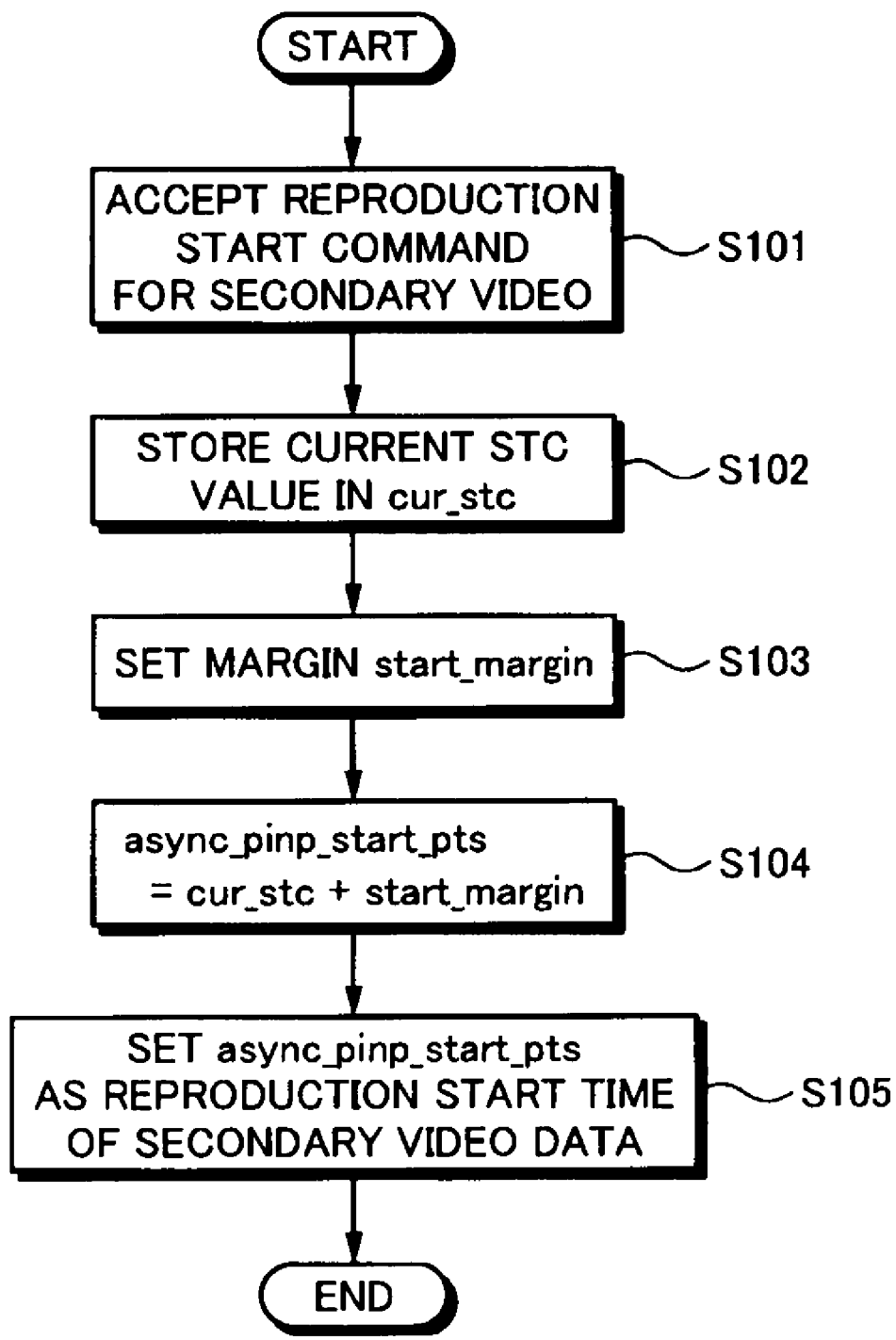
FIG. 21 is a flow chart describing a calculating process for reproduction start timing of secondary video data according to the first modification of this embodiment of the present invention.

Next, the reproducing method according to the first modification of this embodiment of the present invention will be described. With reference to a flow chart shown in FIG. 21, the process that calculates timing at which the reproduction of secondary video data starts will be described. The process exemplified in FIG. 21 is mainly performed by the controlling section 18 of the reproducing apparatus 1.

At step S101, when the user operates the remote control commander or the like, secondary video data are caused to be reproduced. At step S102, the STC value at which the reproduction of secondary video data starts is obtained and stored in value cur_stc that represents the current STC value.

At step S103, a predetermined value, for example, value "300×90" that corresponds to around 300 msec is stored in value start_margin that represents a margin for which the reproduction of secondary video data starts a predetermined time after the current time. This value represents a value of which 300 msec is converted regarding 90 kHz of the STC clock. This margin start_margin becomes a delay of the STC value supplied from the controlling section 18 through the adding device 20 against the STC value supplied from the STC circuit 19.

At step S104, PTS value async_pinp_start_pts that represents a reproduction start time of secondary video data is calculated based on margin start_margin for which the reproduction of secondary video data starts is calculated according to formula (9).

$$async\_pinp\_start\_pts = cur\_stc + start\_margin \quad (9)$$

At step S105, PTS value async_pinp_start_pts, which represents the reproduction start time of the secondary video data, is set as the reproduction start time of the secondary video data to the STC circuit 19.

Figure 22:
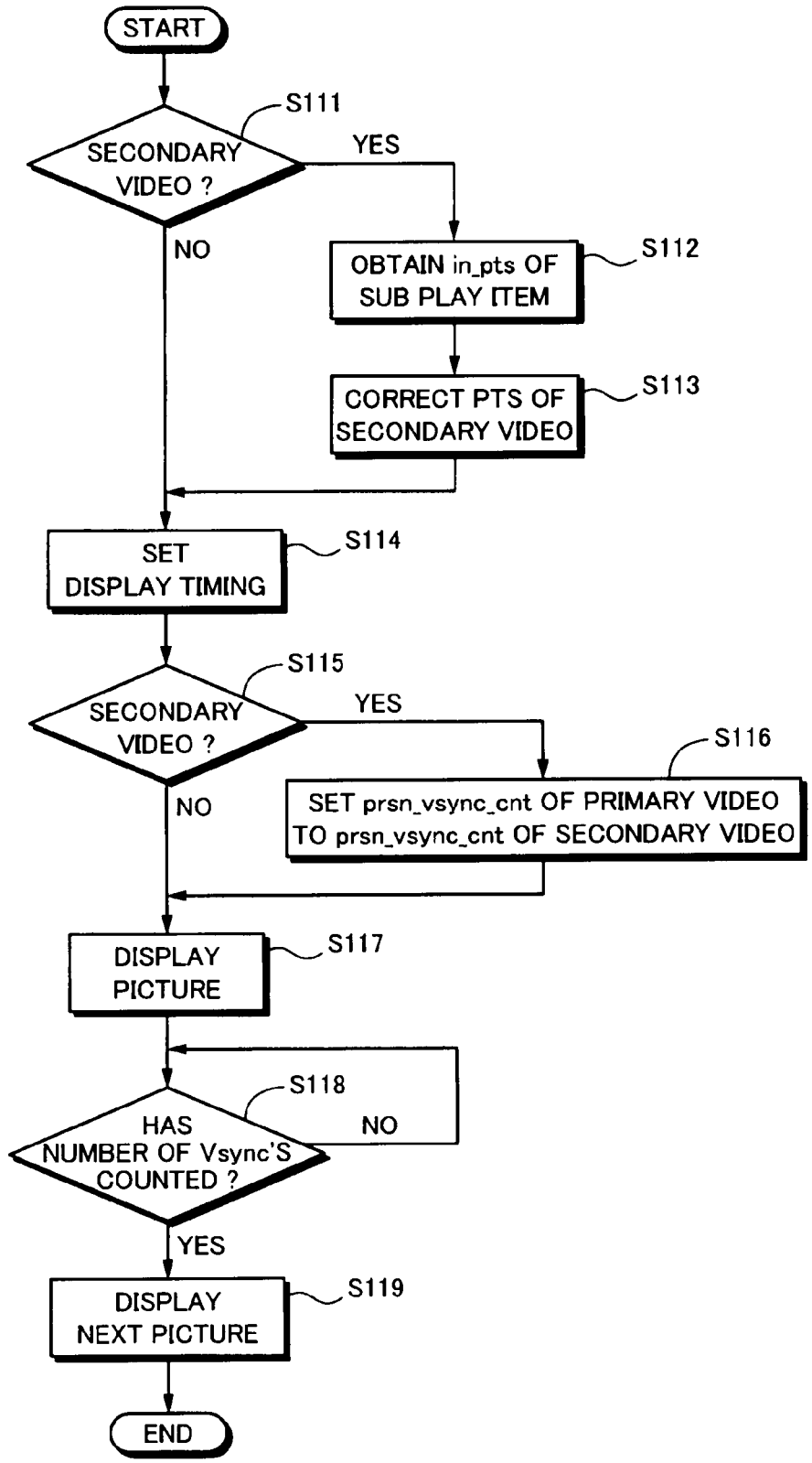
FIG. 22 is a schematic diagram describing the reproducing process according to the first modification of this embodiment of the present invention.

Next, with reference to a flow chart shown in FIG. 22, the reproducing process according to the first modification of this embodiment will be described. At step S111, it is determined whether or not video data to be processed are secondary video data. When the determined result denotes that the video data to be processed are secondary video data, the flow advances to step S112.

At step S112, in_pts of a sub play item corresponding to the secondary video data is obtained. At step S113, in_pts obtained at step S112 is subtracted from the PTS of the secondary video data and async_pinp_start_pts is added to the subtracted result so as to correct the PTS of the secondary video data. Thereafter, the flow advances to step S114.

When the determined result at step S111 denotes that the video data to be processed are not secondary video data, namely primary video data, the flow advances to step S114.

At step S114, a time represented by the PTS of the video data and the STC value are compared to set timing at which the video data are displayed. When the video data to be processed are secondary video data, the PTS value corrected at step S113 is used.

At step S115, it is determined whether or not the video data to be processed are secondary video data. When the determined result denotes that the video data to be processed are secondary video data, the flow advances to step S116.

At step S116, value prsn_vsync_cnt that represents the number of Vsync's for pictures that have been displayed of the primary video data is set to value prsn_vsync_cnt that represents the number of Vsync's for pictures that have been displayed of the secondary video data. Value prsn_vsync_cnt, which represents the number of Vsync's for pictures that have been displayed, can be calculated based on the flow charts shown in FIG. 18 and FIG. 19.

In contrast, when the determined result at step S115 denotes that the video data to be processed are not the secondary video data, the flow advances to step S117. At step S117, when a time represented by the PTS of the video data matches the STC value, a picture is displayed.

Thereafter, at step S118, the number of Vsync's is counted based on value prsn_vsync_cnt, which represents the number of Vsync's for pictures that have been displayed and it is determined whether or not pictures have been displayed for the number of Vsync's. When the determined result denotes that pictures have been displayed for prsn_vsync_cnt, which represents the number of Vsync's, the flow advances to step S119. At step S119, the next picture is displayed.

In contrast, when the determined result denotes that pictures have not been displayed for prsn_vsync_cnt, which represents the number of Vsync's, the flow returns to step S118. At step S118, it is determined whether or not pictures have been displayed for prsn_vsync_cnt, which represents the number of Vsync's.

According to the first modification of this embodiment of the present invention, the remaining number of picture that have been displayed of a group generated by the 3-2 pull-down process for the primary video data that have been reproduced when the reproduction of the secondary video data is caused to start is obtained and set to the number of pictures that have been displayed of a group generated by the 3-2 pull-down process for the secondary video data. Thus, timing at which a picture of a top field of each group of the primary video data can be matched with a picture of a top field of each group of the secondary video data. As a result, coming that occurs when the secondary video data are reproduced can be prevented.

Next, a second modification of this embodiment of the present invention will be described. In the second modification of this embodiment of the present invention, the foregoing third method is used to prevent combining that occurs when secondary video data are reproduced.

In the third method, while pictures of a group generated by the 3-2 pull-down process for primary video data are being displayed, pictures of a predetermined group of secondary video data are caused to be displayed and at timing of which groups of the primary video data are changed, pictures that are displayed of the secondary video data are changed such that timing at which the primary video data are changed match timing at which the secondary video data are changed.

Figure 23:
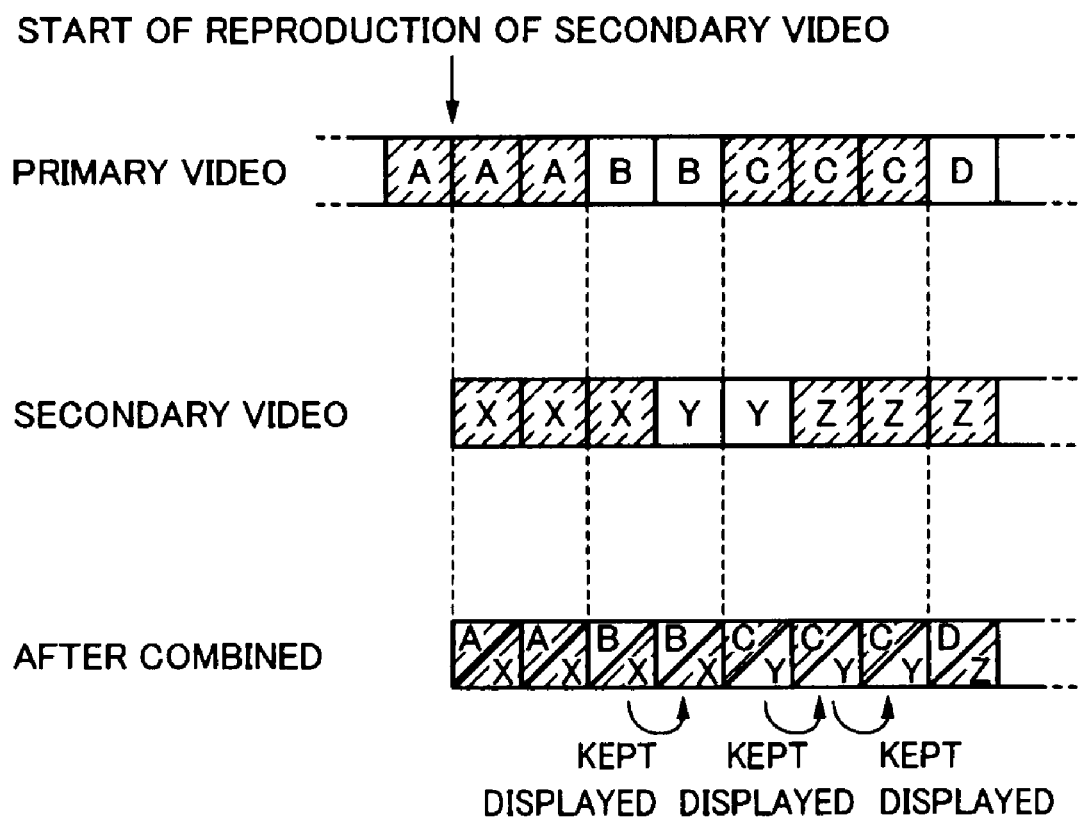
FIG. 23 is a schematic diagram describing a reproducing method according to a second modification of this embodiment of the present invention.

For example, as shown in FIG. 23, picture X of secondary video data displayed when group A is changed to group B of groups generated by the 3-2 pull-down process for the primary video data is kept displayed while pictures of group B of primary video data are being displayed. Likewise, picture Y of secondary video data displayed when group B is changed to group C of groups of primary video data is kept displayed while pictures of group C of the primary video data are being displayed.

In other words, while a picture of a predetermined group of the primary video data is being reproduced, a picture of the secondary video data displayed when a picture of a top field of the predetermined group is displayed is kept displayed. When groups of the primary video data are changed, a picture of a top field of the next group of the secondary video data is displayed.

Figure 24:
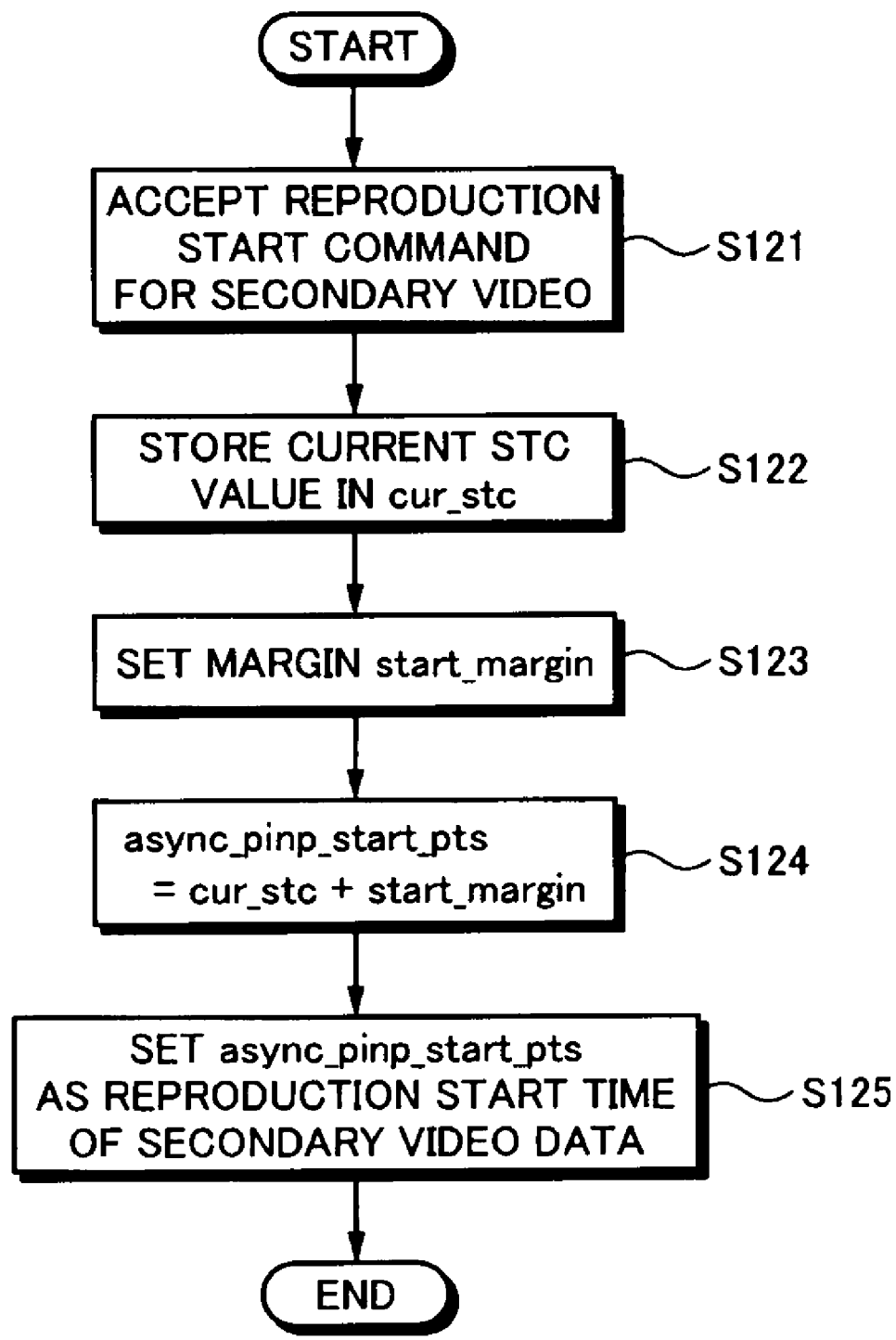
FIG. 24 is a flow chart describing a calculating process for reproduction start timing of secondary video data according to the second modification of this embodiment of the present invention.

Next, the reproducing method according to the second modification of this embodiment of the present invention will be described. With reference to a flow chart shown in FIG. 24, a process that calculates timing at which the reproduction of the secondary video data starts will be described. The process exemplified in FIG. 24 is mainly performed by the controlling section 18 of the reproducing apparatus 1.

At step S121, the user operates the remote control commander or the like to start reproducing the secondary video data. At step S122, the STC value at which the reproduction of the secondary video data started and stored in cur_stc that represents the current STC value.

At step S123, a predetermined value, for example value "300×90" corresponding to for example 300 msec is stored in value start_margin that represents a margin for which the reproduction of the secondary video data starts a predetermined time after the current time. This value represents a value of which 300 msec is converted regarding 90 kHz of the STC clock. This margin start_margin becomes a delay of the STC value supplied from the controlling section 18 through the adding device 20 against the STC value supplied from the STC circuit 19.

At step S124, PTS value async_pinp_start_pts that represents a reproduction start time of the secondary video data is calculated based on margin start_margin for which the reproduction of the secondary video data starts according to formula (10).

$$async\_pinp\_start\_pts = cur\_stc + start\_margin \quad (10)$$

At step S125, PTS value async_pinp_start_pts, which represents the reproduction start time of the secondary video data, is set as a reproduction start time of the secondary video data to the STC circuit 19.

Figure 25:
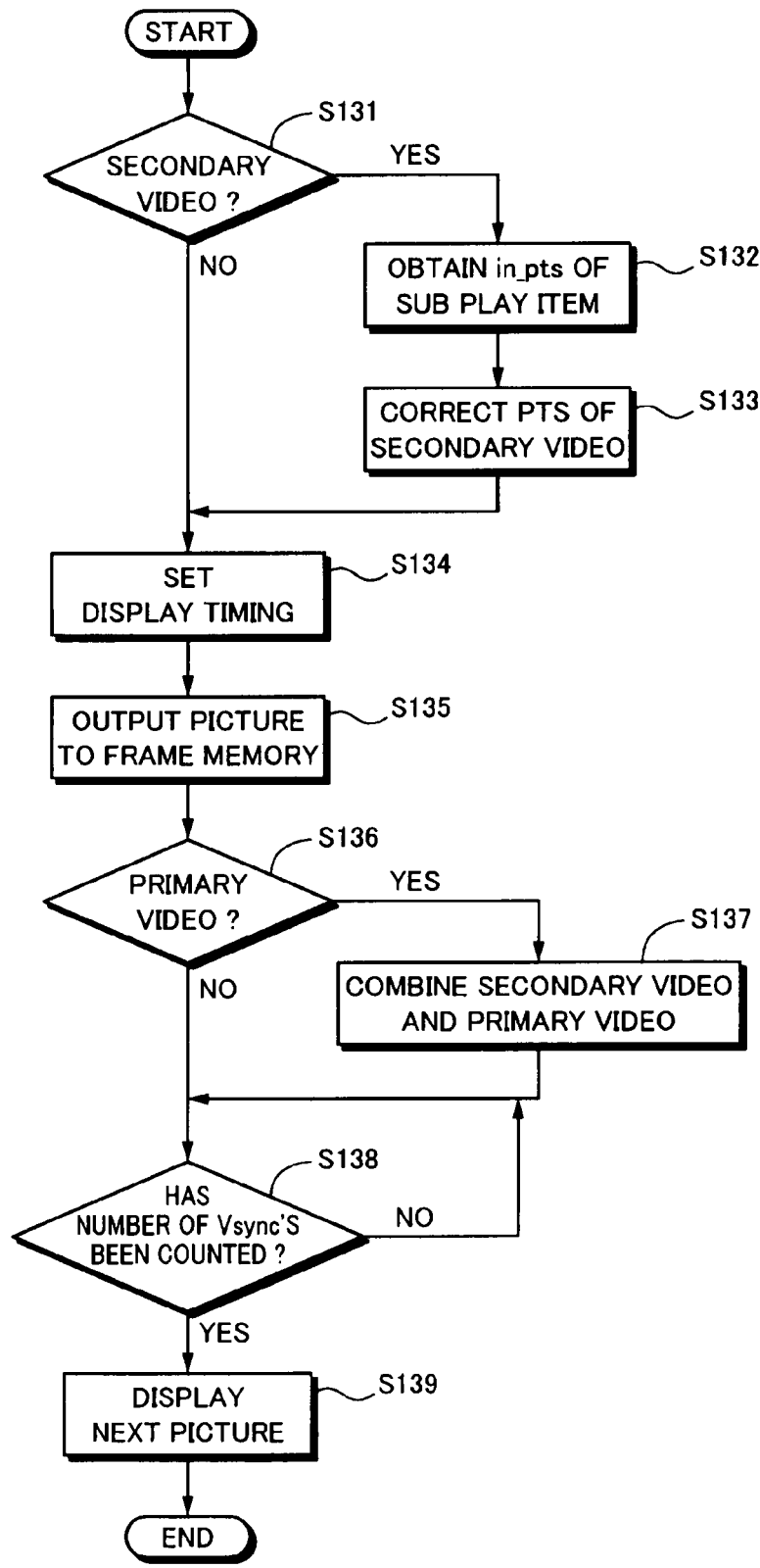
FIG. 25 is a schematic diagram describing a reproducing process according to the second modification of this embodiment of the present invention.

Next, with reference to a flow chart shown in FIG. 25, the reproducing process according to the second modification of this embodiment will be described. At step S131, it is determined whether or not video data to be processed are secondary video data. When the determined result denotes that the video data to be processed are secondary video data, the flow advances to step S132.

At step S132, in_pts of a sub play item corresponding to the secondary video data is obtained. At step S133, in_pts obtained at step S132 is subtracted from the PTS of the secondary video data and async_pinp_start_pts is added to the subtracted result so as to correct the PTS of the secondary video data. Thereafter, the flow advances to step S134.

In contrast, when the determined result at step S131 denotes that the video data to be processed are not secondary video data, namely primary video data, the flow advances to step S134.

At step S134, the time represented by the PTS of the video data is compared with the STC value so as to set timing at which the video data are displayed. When the video data to be processed are secondary video data, the PTS value corrected at sep S133 is used. At step S135, a picture of the video data is output to the display frame memory.

At step S136, it is determined whether or not the video data to be processed are primary video data. When the determined result denotes that the video data to be processed are primary video data, the flow advances to step S137. At step S137, a picture is obtained from the display frame memory for the secondary video data and overwritten to the display frame memory for the primary video data to combine pictures that are displayed.

In contrast, when the determined result as step S136 denotes that the video data to be processed are not primary video data, the flow advances to step S138. At step S138, the number of Vsync's is counted based on value prsn_vsync_cnt that represents the number of Vsync's for picture that have been displayed and it is determined whether or not pictures have been displayed for the number of Vsync's. When the determined result denotes that pictures have been displayed for prsn_vsync_cnt, which represents the number of Vsync's, the flow advances to step S139. At step S139, the next picture is displayed.

In contrast, when the determined result denotes that pictures have not been displayed for prsn_vsync_cnt, which represents the number of Vsync's, the flow returns to step S138. At step S138, it is determined whether or not pictures have been displayed for prsn_vsync_cnt, which represents the number of Vsync's. Value prsn_vsync_cnt, which represents the number of Vsync's, can be calculated based on the flow charts shown in FIG. 18 and FIG. 19.

According to the second modification of this embodiment of the present invention, while pictures of a predetermined group of the primary video data are being displayed, a picture of secondary video data displayed when a picture of a top field of the group is displayed is kept reproduced and when groups of the primary video data are changed, a picture that is displayed of the secondary video data is changed to a picture of a top field of the next group. Thus, timing at which a picture of a top field of each group of the primary video data can be matched with timing at which a picture of a top field of each group of the secondary video data. As a result, combing that occurs when the secondary video data are reproduced can be prevented.

One embodiment of the present invention and a first modification and second modification thereof have been described. Instead, it should be understood by those skilled in the art that various modifications, combinations, sub-combinations and alternations may occur depending on design requirements and other factors insofar as they are within the scope of the appended claims or the equivalents thereof. For example, the case of which a primary video stream and a second video stream are supplied from the same record medium to the reproducing apparatus 1 has been described. Instead, the embodiment of the present invention and the first modification and second modification thereof can be applied to the case of which a primary video stream and a secondary video stream are supplied from different record mediums.

Figure 26:
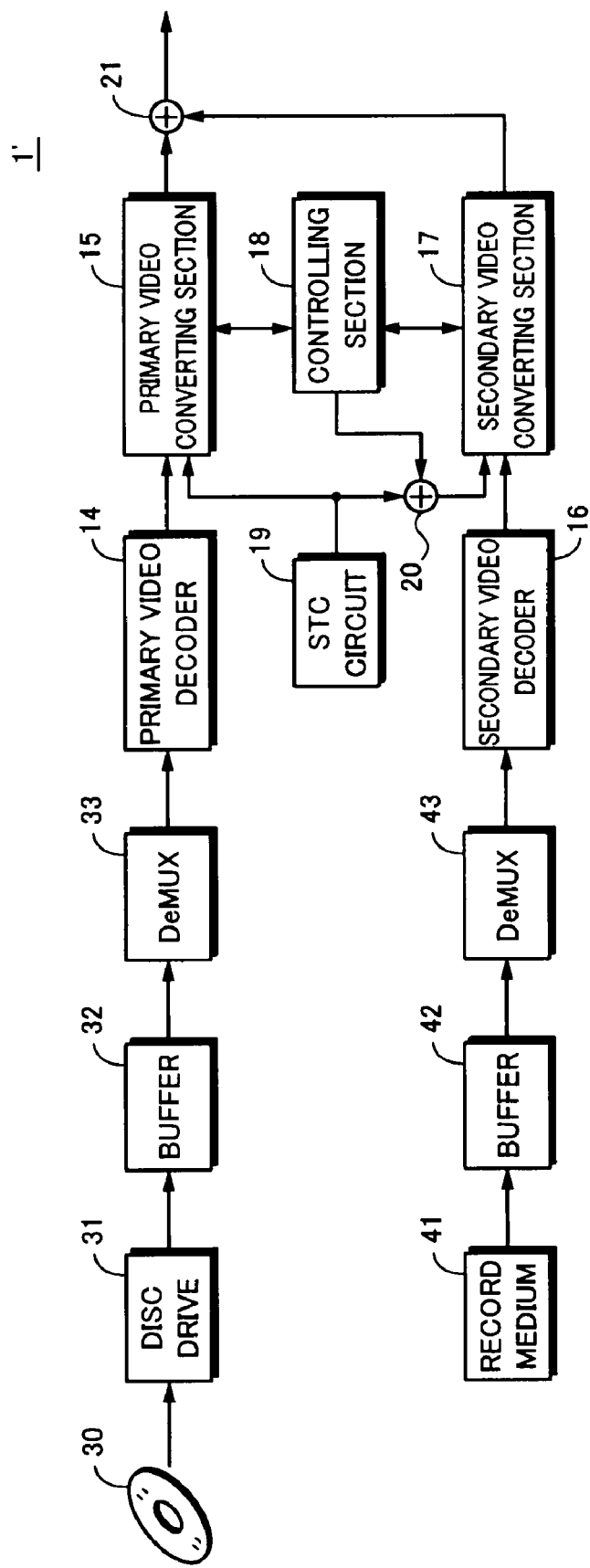
FIG. 26 is a block diagram showing a structure exemplifying another reproducing apparatus according to this embodiment of the present invention.

FIG. 26 shows a structure exemplifying a reproducing apparatus 1' to which first stream data containing a primary video stream and second stream data containing a secondary video stream are supplied from different record mediums. The reproducing apparatus 1' is composed of a disc drive 31, a buffer 32, a demultiplexer (DeMUX) 33, a record medium 41, a buffer 42, a demultiplexer (DeMUX) 43, a primary video decoder 14, a primary video converting section 15, a secondary video decoder 16, a secondary video converting section 17, a controlling section 18, an STC circuit 19, and adding devices 20 and 21. In the reproducing apparatus 1' shown in FIG. 26, sections similar to those of the reproducing apparatus 1 will be denoted by similar reference numerals and their description will be omitted.

The first stream data are recorded to a detachable record medium 30 that is supplied to the user. The record mediums 30 may include a disc-shaped record medium such as a BD-ROM.

The disc drive 31 reproduces first stream data from the record medium 30 loaded into the disc drive 31. First stream data have been recorded on the record medium 30 in the form of a transport stream (TS) or a program stream (PS), for example, defined in the MPEG2 System. In the first stream data, video data and audio data have been multiplexed. The transport stream or the program stream reproduced from the record medium 30 is supplied to the buffer 32. The buffer 32 supplies the first stream data to the demultiplexer 33 under the control of the controlling section 18.

The demultiplexer 33 separates a primary video stream from the supplied first stream data. When first stream data are supplied as a transport stream from the demultiplexer 33, the demultiplexer 33 analyzes the PID for each transport packet, collects packets for primary video data, and restores the primary video stream.

On the other hand, second stream data have been downloaded through a communication network such as the Internet and then recorded on the record medium 41. The record mediums 41 may include a semiconductor memory such as a flash memory and a detachable hard disk drive (HDD).

A transport stream or a program stream that is output from the a record medium 41 is supplied to the buffer 42. The buffer 42 supplies the second stream data to the demultiplexer 43 under the control of the controlling section 18.

The demultiplexer 43 separates a secondary video stream from the second stream data. When second stream data are supplied as a transport stream from the buffer 42, the demultiplexer 13 analyzes the PID of each transport packet, collects packets for the secondary video data, and restores the secondary video stream.

What is claimed is:

1. A reproducing apparatus which simultaneously reproduces a first video signal and a second video signal reproduced at any timing relative to the first video signal, comprising:
a first converting section to output the first video signal having a first frame frequency alternately for three successive frames and two successive frames and to convert the first video signal having the first frame frequency into a converted first video signal having a second frame frequency, the first frame frequency and the second frame frequency having a relationship of 2 to 5;
a second converting section to output the second video signal having the first frame frequency alternately for three successive frames and two successive frames and to convert the second video signal having the first frame frequency into a converted second video signal having the second frame frequency, the first frame frequency and the second frame frequency having a relationship of 2 to 5;
a synchronization unit to generate a synchronization signal to synchronize the converted first video signal with the converted second video signal, and to provide the synchronization signal to the first converting section and the second converting section, the synchronization signal being provided to the second converting section via the first converting section and an adder device; and
a controlling section to cause the synchronization unit to delay the synchronization signal provided to the to the second converting section via the adder with respect to the first converting section such that timing at which a field group based on fields of the three successive frames of the converted first video signal is changed to a field group based on fields of the two successive frames thereof matches timing at which a field group based on fields of the three successive frames of the converted second video signal is changed to a field group based on fields of the two successive frames thereof.

2. The reproducing apparatus as set forth in claim 1, wherein the controlling section calculates timing at which the reproduction of a top field of the field group of fields of the three successive frames of the converted first video signal starts when the second video signal is reproduced at any timing, and
wherein the controlling section matches the calculated timing and timing at which the reproduction of a top field of the field group of the fields of the three successive frames of the converted second video signal.

3. The reproducing apparatus as set forth in claim 1, wherein the controlling section calculates remaining numbers of fields of the field groups based on the fields of the three successive frames and the two successive frames of the converted first video signal when the second video signal is reproduced at any timing, and
wherein the controlling section matches the number of fields of the field group based on the fields of the first three successive frames or the first two successive frames of the converted second video signal with the remaining numbers of fields.

4. The reproducing apparatus as set forth in claim 1, wherein the controlling section keeps reproducing the fields of the three successive frames and two successive frames of the converted second video signal at timing of which a top field of the field group of the fields of the three successive frames and the two successive frames of the converted first video signal is reproduced when the second video signal is reproduced at any timing and the field groups based on the fields of the three successive frames and two successive frames of the converted first video signal are changed.

5. The reproducing apparatus as set forth in claim 1, wherein the first video signal and the second video signal have been recorded on the same record medium.

6. The reproducing apparatus as set forth in claim 5, wherein the first video signal and the second video signal have been recorded on a BD-ROM.

7. The reproducing apparatus as set forth in claim 1, wherein the first video signal and the second video signal have been recorded on different record mediums.

8. The reproducing apparatus as set forth in claim 7, wherein the first video signal is recorded on a BD-ROM.

9. A reproducing method of simultaneously reproducing a first video signal and a second video signal reproduced at any timing against the first video signal, comprising the steps of:

outputting the first video signal having a first frame frequency alternately for three successive frames and two successive frames as a converted first video signal having the first frame frequency into the first video signal having a second frame frequency, the first frame frequency and the second frame frequency having a relationship of 2 to 5;

outputting the second video signal having the first frame frequency alternately for three successive frames and two successive frames as a converted second video signal having the first frame frequency into the second video signal having the second frame, the first frame frequency and the second frame frequency having a relationship of 2 to 5;

generating a synchronization signal to synchronize the first converted video signal with the second converted video signal;

providing the synchronization signal to a converter of the second video signal via two different paths; and performing control, in a processor, to delay the synchronization signal provided to the converter of the converted second video signal provided through one of the two paths with respect to the converted first video signal such that timing at which a field group based on fields of the three successive frames of the converted first video signal is changed to a field group based on fields of the two successive frames thereof matches timing at which a field group based on fields of the three successive frames of the converted second video signal is changed to a field group based on fields of the two successive frames thereof.

10. A non-transitory computer-readable medium encoded with computer-readable instructions that when executed by a processor cause the processor to perform a reproducing method of simultaneously reproducing a first video signal and a second video signal reproduced at any timing against the first video signal, the reproducing method comprising:

outputting the first video signal having a first frame frequency alternately for three successive frames and two successive frames as a converted first video signal having the first frame frequency into the first video signal having a second frame frequency, the first frame frequency and the second frame frequency having a relationship of 2 to 5;

outputting the second video signal having the first frame frequency alternately for three successive frames and two successive frames as a converted second video signal having the first frame frequency into the second video signal having the second frame, the first frame frequency and the second frame frequency having a relationship of 2 to 5;

generating a synchronization signal to synchronize the first converted video signal with the second converted video signal;

providing the synchronization signal to a converter of the second video signal via two different paths; and performing control to delay the synchronization signal provided to the converter of the converted second video signal provided through one of the two paths with respect to the converted first video signal such that timing at which a field group based on fields of the three successive frames of the converted first video signal is changed to a field group based on fields of the two successive frames thereof matches timing at which a field group based on fields of the three successive frames of the converted second video signal is changed to a field group based on fields of the two successive frames thereof.

11. The reproducing apparatus according to claim 1, wherein the converted first video signal includes a time stamp, and the first converting section outputs the converted first video signal only when a value of the synchronization signal corresponds to the time stamp.

12. The reproducing apparatus according to claim 5, further comprising:

a demultiplexer to demultiplex the first video signal and the second video signal, the demultiplexer providing the first video signal to the first converting section and the second video signal to the second converting section.

13. The reproducing apparatus according to claim 11, wherein the time stamp indicates a reproduction point video data.

14. The reproducing apparatus according to claim 11, wherein the time stamp indicates a reproduction point of audio data.

15. The reproducing apparatus according to claim 5, wherein the first video signal and the second video signal are encoded according to at least one of MPEG4, H.264 or VC-1.

16. The reproducing apparatus according to claim 1, wherein the second converting section resizes the converted second video signal.

17. The reproducing apparatus according to claim 16, wherein the converted second video signal and the converted first video signal are output as a picture-in-picture.

* * * * *